(12) United States Patent
Kwei

(10) Patent No.: US 7,792,699 B2
(45) Date of Patent: Sep. 7, 2010

(54) SYSTEM AND METHOD FOR POOLED ELECTRONIC PURCHASING

(76) Inventor: David Wah Hao Kwei, 4/50 Leicester Street, Carlton, Victoria 3053 (AU)

(*) Notice: Subject to any disclaimer, the term of this patent is extended or adjusted under 35 U.S.C. 154(b) by 0 days.

(21) Appl. No.: 10/477,920

(22) PCT Filed: May 20, 2002

(86) PCT No.: PCT/AU02/00623

§ 371 (c)(1),
(2), (4) Date: Nov. 18, 2003

(87) PCT Pub. No.: WO02/095635

PCT Pub. Date: Nov. 28, 2002

(65) Prior Publication Data

US 2004/0148228 A1      Jul. 29, 2004

(30) Foreign Application Priority Data

May 21, 2001   (AU) ..................... PR5133

(51) Int. Cl.
*G06Q 30/00* (2006.01)
(52) U.S. Cl. ......................... 705/26; 705/27
(58) Field of Classification Search ............. 705/26, 705/27
See application file for complete search history.

(56) References Cited

U.S. PATENT DOCUMENTS

| 5,663,547 | A | * | 9/1997 | Ziarno .................. 235/380 |
| 5,664,110 | A | * | 9/1997 | Green et al. ............ 705/26 |
| 5,696,366 | A | * | 12/1997 | Ziarno .................. 235/380 |
| 5,794,219 | A |   | 8/1998 | Brown |
| 6,493,742 | B1 | * | 12/2002 | Holland et al. .......... 709/200 |

FOREIGN PATENT DOCUMENTS

| WO | 00/11570 A | 3/2000 |
| WO | 00/31607 A | 6/2000 |
| WO | 00/43929 A | 7/2000 |

(Continued)

OTHER PUBLICATIONS

Solutions Partners Company Press, gMoney Corporation, Copyright © 2003.*

(Continued)

*Primary Examiner*—Jason Dunham

(57) ABSTRACT

A retailing method executable by a computer system, includes sending a page to a prospective purchaser in response to a request, the page being associated with a specific product; receiving a purchase proposal from the prospective purchaser for direct purchase of the product at a fixed price, the purchase proposal including identifier information of persons nominated by the prospective and purchase term information selected at least in part by the prospective purchaser, the nominated persons being nominated to contribute to purchase of the product at the fixed price.

12 Claims, 18 Drawing Sheets

U.S. PATENT DOCUMENTS

| | | | |
|---|---|---|---|
| 6,785,671 B1 * | 8/2004 | Bailey et al. | 707/3 |
| 7,099,840 B1 * | 8/2006 | Sullivan | 705/37 |
| 2001/0021920 A1 * | 9/2001 | Ikeda | 705/26 |
| 2002/0042775 A1 * | 4/2002 | Nelson et al. | 705/39 |
| 2002/0087427 A1 * | 7/2002 | Ganesan et al. | 705/26 |
| 2002/0128934 A1 * | 9/2002 | Shaer | 705/27 |
| 2002/0138573 A1 * | 9/2002 | Saguy | 709/204 |
| 2003/0018538 A1 * | 1/2003 | Tomita et al. | 705/26 |

FOREIGN PATENT DOCUMENTS

| | | |
|---|---|---|
| WO | 00/46727 A | 8/2000 |
| WO | 00/50970 A | 8/2000 |
| WO | WO 00/45318 | 8/2000 |
| WO | 00/75846 A | 12/2000 |
| WO | WO 01/29787 A2 | 4/2001 |

OTHER PUBLICATIONS

About the gMoney web application, pp. 1-2, http://www.gmoney.com/g/?location=934 Jul. 16, 2004.*

Solutions Partners Company Press, gMoney Corporation, Copyright © 2003.

About the gMoney web application, pp. 1-2, http://www.gmoney.com/g/?location=934 Jul. 16, 2004.

Press Release issued on Aug. 18, 2001 by gMoney Corporation announcing the beta release of gGifts product.

* cited by examiner

501 Enter your details:

502 First name

503 Last name

504 Email

505 Will you contribute to the purchase?

506 ● Yes  ○ No

507 How many people must participate?

Min. 508 2

Max. 509 2

510 This will mean individual contributions of:

511 $ [X.00] – [Y.00]

512 Who will you invite?

513 First name

514 Last name

515 Email

516 Add

517
[Invitee 1 details]
[Invitee 2 details]

518 Edit

519 Remove

520 View address book

521 Can Invitees be substituted?

522 ● Yes  ○ No

523 Can Invitees be added?

524 ● Yes  ○ No

525 << Go back

526 Help

528 Enter your details:
529 First name
530 Last name
531 Email

532 Will you contribute to the purchase?
533 ◉ Yes  ○ No

534 Who will you invite?
535 First name
536 Last name
537 Email
538 Amount
539 Add

540
[Invitee 1 details]
[Invitee 2 details]

541 Total:

542 Edit
543 Remove
544 View address book

545 Recalculate

546 Can Invitees be substituted?
547 ◉ Yes  ○ No

548 << Go back
549 Help
550 Continue >>

*Fig.5B*

551 Enter your details:

552 First name

553 Last name

554 Email

555 Will you contribute to the purchase?

556 ● Yes ○ No

557 Who will you invite?

558 First name

559 Last name

560 Email

561 Add

562
[Invitee 1 details]
[Invitee 2 details]

563 Edit

564 Remove

565 View address book

566 Can Invitees be substituted?

567 ● Yes ○ No

568 Can Invitees be added?

569 ● Yes ○ No

570 << Go back

571 Help

Welcome [name of Invitee]!

[Coordinator] invites you to contribute $Z towards [item(s)] for [ultimate recipient(s)], who is/are [details of occasion].

802

[Another person has][Other people have] also been asked to contribute towards the total price of $W:

| 803 | 804 | 805 |
|---|---|---|
| Details of Invitees: | Amount: | Current Status: |
| [Invitee 1] | $X.00 | [Agreed] |
| [Invitee 2] | $Y.00 | [Awaiting response] |

806

If you agree to join in, you will be asked to provide your credit card details over our secure network. If the required amount is raised before [cut-off date] the [item(s)] will be shipped to [shipment details].

If the required amount is not raised before [cut-off date], your credit card will not be charged.

Would you like to participate?

807 Yes, I want to participate

808 No, I do not want to participate

809 Click for explanation of system and method

Welcome [name of Invitee]! ...

811

*Other people have also been asked to contribute equal amounts towards the total price of $W:*

812

Details of Invitees:

[Invitee 1]

[Invitee 2]

813

Current Status:

[Declined]

[Awaiting response]

814

[Item(s)] will be purchased if a [minimum of $X$] [and] [a maximum of $Y$] people agree to join in. This means that each person will contribute between [$$B$] and [$$C$] each (assuming between $X$ and $Y$ of the above people agree to participate).

[Currently $Z$ people have agreed to participate, therefore the maximum you will be asked to pay is $$D$ and the minimum you will be asked to pay is $$C$.]

815

If you agree to participate ...

Would you like to participate?

816

Yes, I want to participate

817

No, I do not want to participate

818

Click for explanation of system and method

Welcome [name of Invitee]! ...

820

[Coordinator] asks you to contribute an amount of your choice [up to $W][above $X][between $Y and $Z]. [Another person has][Other people have] also been asked to contribute towards the total price of $V. Currently:

821

| | |
|---|---|
| Target: | $V.00 |
| Amount raised: | $B.00 |
| Balance outstanding: | $C.00 |

| 822 | 823 | 824 |
|---|---|---|
| Details of Invitees | Amount | Current Status |
| Invitee 1 | $X.00 | [Agreed] |
| Invitee 2 | $0.00 | [Declined] |
| Invitee 3 | $N.A. | [Awaiting response] |

825

If you agree to participate ...

826

Yes, I want to participate

827

No, I do not want to participate

828

Click for explanation of system and method

*Fig. 8C*

901 Your Name:

902 First Name

903 Surname

904 Credit Card Type:

905 [Accepted Cards]

906 Credit Card Number:

907

908 Card Expiry Date

909 Month

910 Year

911 Payment Approval Amount:

912 $ [X.00] [Minimum]

913 $ [Y.00] [Maximum]

914 [The balance outstanding is $ Y.00]

915 Continue

916 Go Back

SYSTEM AND METHOD FOR POOLED ELECTRONIC PURCHASING

This application is the US national phase of international application PCT/AU02/00623 filed 20 May 2002, which designated the US. PCT/AU02/00623 claims priority to AU Application No. PR 5133, filed 21 May 2001. The entire contents of these applications are incorporated herein by reference.

A. FIELD OF THE INVENTION

The field of the invention is automated joint purchasing. In particular it is a computer implemented system and method for accumulating donations towards a specific gift (as opposed to a gift voucher) using an electronic communications network such as the Internet. This is called Pooled Electronic Purchasing or PEP.

B. BACKGROUND TO THE INVENTION

There are many occasions when people purchase gifts jointly rather than separately. Such purchases are often made for birthdays, weddings and engagements, mothers' and fathers' days, retirements, leavings and goings away, bar mitzvahs and bat mitzvahs etc.

The motivations for making such purchases are numerous. For example, by joining their individual donations, the participants can afford a more expensive gift than they would be able to afford separately. There are also times when individuals regard the act of contributing to a joint gift as being appropriate or desirable in itself. For example, all of the children in a family might want to give their parents a joint anniversary gift, or all of the members of a sporting team might want to give a departing member a gift from the entire team. The co-operation exhibited can signify the connection between the gift givers and their relationship with the recipient. Another motivation held by people participating in a joint gift is convenience. It is often more convenient for a group of six people to organise one gift between them rather than six gifts separately. Often, people giving joint gifts will have more than one motive behind their actions.

3. Traditional Joint Purchasing

Traditionally, group gifts are bought when group members physically travel to a store where they choose, pay for, and pick up the item.

However, people frequently encounter problems when buying joint gifts in this manner. Depending upon the particular circumstances:

it may be difficult or impossible to get people together to coordinate the purchase (due to them living or working far apart or leading busy lives);

not everyone has a say in selecting the goods or services;

a minority of the group has the burden of choosing and collecting the gift;

the person who pays the supplier may encounter difficulties in being reimbursed, perhaps recovering payment late (possibly incurring interest charges) or not at all;

some people ultimately pay too much or too little; and the person who pays the supplier obtains all of the rewards program points associated with the payment, while the others receive none.

When group gifts are organised using traditional methods, vendors miss out on valuable information that can assist their businesses. In most instances, there is no way for the retailer to know that the purchase is a gift, or to identify the recipient or the other people involved in the purchase of the gift. There is no way for the retailer to turn these absent parties into customers.

1. Electronic commerce prior art

The relevant prior art can be divided into three groups: demand aggregation systems, person-to-person (P2P) payment systems and donation accumulation systems.

a) Demand aggregation systems

An example of a demand aggregation system is described in Patent Publication Number WO00/45318, "Aggregating on-line purchase requests". This system aggregates demand for particular products so that multiple "low volume" purchasers can take advantage of high volume discounts. It operates in accordance with a "buy cycle", which is constituted by:

a server posting a web page containing an offer describing a product and listing prices for various quantities of that product;

the acceptance and aggregation of multiple purchase orders from a plurality of purchasers; and the closing of the offer in accordance with pre-established criteria, generally with the aim of maximising the quantity sold and minimising the unit price.

This system is designed to lower the unit price that can be obtained by the purchasers, and to increase the vendor's ability to attract large volume orders. This is a common feature of all demand aggregation systems. However, such systems are of little or no relevance to individuals wishing to purchase a joint gift. First, they do not facilitate the purchase of a single item or a small volume of items by a group of purchasers, as they are concerned with the aggregation of multiple purchase orders rather than the accumulation of the contributions from a plurality of purchasers to create a single, indivisible purchase order. Secondly, the minimization of the unit price is rarely the primary motive for buying a group gift. It can be seen that the present invention does not operate in accordance with a "buy cycle" as defined in Patent Publication No. WO 00/45318, or in accordance with other demand aggregation systems.

b) P2P Payment Systems

The prior art also discloses a number of systems—known as Person-To-Person or P2P Payment Systems—that utilise the Internet to enable payments between individuals. One such system can be found at www.paypal.com. In order to make a payment using this system, a person (the donor) becomes a member by setting up a Paypal account. This account is linked to a private bank or credit card account. The donor sends an email to his or her friend (the recipient), stating that the sum can be collected from the Paypal site. When the recipient visits this web site, he or she becomes a member (if not already a member), and can then accepts the transfer of the money. The Paypal system administers the transfer of the funds between the linked bank or credit card accounts of the donor and the recipient. Similar systems may be found at www.c2it.com, and paydirect.com.

Such systems can be used to organize group gifts. One group member can purchase the item, and can then ask the other members to pay for their respective shares by using one or more P2P payment systems. This means it is not necessary for the gift givers to get together in order to exchange their payments. Further, by using Internet services such as the World Wide Web and e-mail, the gift givers can each have a say in the choice of the gift, and it can be delivered to one of the group or directly to the recipient. Lastly, it is possible for more than one of the joint purchasers to obtain the rewards points associated with the use of credit card or other electronic payment systems.

Nevertheless, when used to coordinate the payments for group gifts, these services invariably involve a number of disadvantages for the joint purchasers. For example:

- as with traditional methods, the person who pays the supplier may encounter difficulties in being reimbursed by the others;
- it is still possible that some people will pay the wrong amount;
- the joint purchasers are usually required to become members of the various P2P Payment Systems before they can make or receive payments (which may involve cost and inconvenience);
- the systems require the completion of at least two distinct stages: the purchase of the gift from the vendor, and the payments between the joint purchasers; and
- the systems usually require one of the joint purchasers to keep track of the payments between the group members.

The use of P2P Payment systems by customers does not solve any of the disadvantages for the retailers, who still have no systematic way of knowing that the purchase is a gift, or the identity of the people involved in the purchase of the gift. Again, there is no way for the retailer to turn these absent parties into customers.

c) Donation Accumulation Systems

The last group of prior art systems can be referred to as donation accumulation systems. These systems use computers to register and accumulate the offers of joint purchasers, and to effect a purchase. Unlike demand aggregation systems, donation accumulation systems function in low-volume as opposed to high volume purchasing environments.

The first such system is one described in U.S. Pat. No. 5,794,219, entitled "Method of conducting an on-line auction with bid, pooling". This patent describes a method of accumulating bids from multiple members of an auction consortium during a bidding session at an on-line auction. A central computer coordinates the registration of bidding groups, and then combines the bids from the individuals in the consortium. Traditionally, bidders in an auction can only win if they can personally secure sufficient funds to cover a winning bid. The method described in U.S. Pat. No. 5,794,219 overcomes this disadvantage by allowing the accumulation of smaller funds.

Unfortunately, this system is of limited application to joint gift givers, as appropriate gifts are not often offered for sale at auction. Gifts are usually purchased in a retail rather than an auction environment. In retail sales, the price is generally set by the vendor and is usually not negotiable, whereas in an auction environment, the price is largely determined by the highest bidding purchaser. The system described in U.S. Pat. No. 5,794,219 does not describe how to accumulate the individual contributions where the price is set. In such circumstances, it is desirable for the system to ensure that the total contributions of the joint purchasers does not exceed the price of the item, and that the joint purchasers are satisfied with the relative sizes of their individual contributions.

The second system in this category is described in International Patent Publication No. WO 01/29787, entitled "System and Method for Accumulating Individual Gifts to Create a Group Gift", by Giftcertificates.com, Inc, and is considered to be the closest prior art to the present invention. This document describes a system for automating the task of accumulating a group gift to be donated to a recipient where the item purchased is a gift certificate, electronic voucher, or negotiable instrument such as a bank cheque. The system works when a person, referred to as the promoter, accesses a software application via a network to initiate a "gift campaign". A gift campaign is defined as the task of contacting a group of participants for the purpose of soliciting donations or contributions to a group gift for the benefit of a recipient.

The promoter identifies potential participants by an e-mail address and optionally identifies a number of factors, including: the reason for the gift campaign (e.g. birthday); a suggested individual donation amount; and a total gift goal.

Finally, the promoter must identify a triggering event that will be used to terminate the gift campaign. It is explained that the triggering event may be a particular date or time at which the gift campaign will terminate, or it may be another event such as the reaching of an aggregate gift amount. The software application then contacts each of the identified participants by e-mail.

The participants can respond by clicking on a Universal Resource Locator (URL), which prompts the software application to make a donation page available to them. The donation page is described as including a field to allow the participant to input the amount of the individual donation. This field is described as taking the form of a drop-down menu having several discrete donation amounts. The donation page also includes a field designed to accept credit card information from the participant.

It is explained that a triggering event terminates the gift campaign and the service provider creates a gift certificate for presentation to the recipient. One of the embodiments explained involves the issue of a digital certificate that may be spent by the recipient at any of several online vendors who have a business relationship with the provider using the system described.

The Giftcertificates.com system addresses certain problems associated with traditional forms of joint purchasing. It avoids the need for the participants to get together to coordinate the purchase, and alleviates the need for one person to make a payment on behalf of the group, thereby preventing reimbursement problems.

Unfortunately, the system still presents a number of disadvantages for those interested in making joint purchases to give as gifts. The chief of these is that it does not provide a way to administer the joint purchase of a specific gift (as opposed to a gift certificate). While gift certificates offer the advantage of the recipient being able to choose a gift that he or she would like, they have the disadvantage of being considered by some to be a less personal and less thoughtful gift. According to a survey by Forrester Research entitled "The Hidden Value in Gift Sales" (Carrie A. Johnson, May 2001) only 5% of shoppers have bought a gift certificate online. 27% of consumers have not purchased a gift certificate online because they don't give gift certificates in general.

It would be possible for consumers to contribute funds towards a gift certificate and then to choose a specific gift with the money raised. However this would be a two-stage process, which is somewhat inconvenient.

The purchase of gift certificates is similar to purchase at auctions in that the price is not set by the vendor. It is determined by adding up the individual contributions. As discussed above, where the price is set, joint purchasers of gifts have an interest in ensuring that no surplus funds are paid to the vendor. Therefore it is desirable for the computer system to coordinate the contributions so that they add up to the price of the chosen items. Where a gift certificate is chosen, the total amount of the gift is not crucial to the sale. A gift certificate for the accumulated amount can be issued whenever the nominated time expires. Further if the triggering event is a total amount, it does not matter if the combined total of the contributions has exceeded this amount, because the excess goes to the recipient, who can spend it on the gift. Where a specific gift is subsequently chosen by the gift recipient when redeeming the gift certificate, any contributions made in excess of the price of the item purchased must be disposed of in some way. Conversely, where a specific gift is being purchased jointly, there must be a way of dealing with contributions made by participants when the price of the items has not been reached. For example, if a gift costs $100, but the gift campaign fails because only $80 can be raised from amongst the joint purchasers, there must be a way of refunding the $80 to the relevant people, or of ensuring there has been no transfer in these circumstances. Unfortunately, the system described in Patent Publication No. WO 01/29787 does not address such problems.

Often the purchasers have an interest, not just in completing the purchase, but also in ensuring they are satisfied with the relative sizes of their individual contributions. Joint purchasers may want to pay equal portions. Alternatively, some people may want to pay a higher portion than others, perhaps due to having a closer relationship with the gift recipient, or more funds to contribute. The Giftcertificates.com system does not provide a mechanism for assisting the purchasers in this way.

The reference to any prior art in this specification is not, and should not be taken as, an acknowledgment or any form of suggestion that that prior art forms part of the common general knowledge in Australia.

C. SUMMARY OF THE INVENTION

There is a need for a system for coordinating the low volume, joint purchase of specific gifts where the total price is set by the vendor which:
  does not require the joint purchasers to come together to coordinate the purchase;
  assists each joint purchaser to have a say in the selection of the gift;
  does not require one person to pay the supplier on behalf of the group, and ensures that no person has difficulties in being reimbursed by the others;
  ensures that each person pays the correct or agreed amount;
  enables each joint purchaser to obtain the rewards program points associated with his or her portion of the purchase;
  does not require membership of the system before it can be used;
  allows the joint purchase to be effected in only one stage;
  automatically keeps track of the payments by or between the group members;
  ensures that the total contributions do not exceed the price of the gift;
  ensures there is no value transfer from the purchasers to the vendor until the purchase has been judged to be successful;
  assists the joint purchasers to pay appropriate proportions of the overall purchase; and which
  assists the vendor by identifying that the proposed purchase is a gift, and identifying the people who are participating in the purchase.

Embodiments of the present invention attempt to provide one or more of the above features.

Advantageously, if the vendor knows the purchase is a gift, it can include a complimentary item in the package, or a greeting card and some information about its business or products when the gift is delivered. Thus the difficult and expensive tasks of identifying a potential customer in the vendor's target market, and of mailing promotional items and information have been performed in the time of, and at the expense of, a customer. Further, the Vendor can reward the Coordinator for organising the gift by giving discounts on future purchases or other incentives. This may serve to encourage further purchases (gifts and non-gifts). Lastly, in one embodiment of the invention, the Participants signify their consent to join in by visiting the vendor's web site and providing their credit card details. This provides the vendor with an opportunity to provide these potential customers with information that will encourage them to make further purchases in the future (e.g. specials, promotional material etc).

An exemplary embodiment of the present invention provides a retailing method executable by a computer system, including the steps of:
  sending a page to a prospective purchaser in response to a request, said page being associated with a specific product;
  receiving a purchase proposal from said prospective purchaser for direct purchase of said product at a fixed price, the purchase proposal including identifier information of persons nominated by the prospective purchaser and purchase term information selected at least in part by the prospective purchaser, said nominated persons being nominated to contribute to purchase of said product at said fixed price.

The present invention further provides a computer system for executing a retailing method, including:
  means for sending a page to a prospective purchaser in response to a request, said page being associated with a specific product;
  means for receiving a purchase proposal from said prospective purchaser for direct purchase of said product at a fixed price, the purchase proposal including identifier information of persons nominated by the prospective purchaser and purchase term information selected at least in part by the prospective purchaser, said nominated persons being nominated to contribute to purchase of said product at said fixed price.

The exemplary embodiment of the present invention further provides a retail purchasing method executable by a computer system, including the steps of:
  receiving at said computer system a page in response to a request therefor, said page being associated with a specific product;
  creating a purchase proposal for direct purchase of said product at a fixed price using said computer system, the purchase proposal including identifier information of persons nominated by a prospective purchaser and purchase term information selected at least in part by the prospective purchaser, said nominated persons being nominated to contribute to purchase of said product at said fixed price; and
  submitting said purchase proposal to a retailer system.

The exemplary embodiment of the present invention further provides a retailing method executable by a computer system, including:
  receiving a purchase proposal from a prospective purchaser for direct purchase of a specific product at a fixed price, the purchase proposal including identifier information of persons nominated by the prospective purchaser and purchase term information selected at least in part by the prospective purchaser, said nominated persons being nominated to contribute to purchase of said product at said fixed price.

The exemplary embodiment of the present invention further provides computer readable storage having stored thereon program instructions which, when executed by a computer, cause the computer to perform the steps of the above methods. The present invention also provides computer software for performing the steps of the above methods.

The exemplary embodiment of the present invention generally relates to a system and method for Pooled Electronic Purchasing using a server system and one or more client systems. It addresses or ameliorates one or more of the problems associated with jointly purchasing specific gifts that are encountered when using traditional methods, and the known demand aggregation and donation accumulation systems through:

- the selection of a specific item or items where the price is set by the vendor using delivery information specified by a customer (referred to as the Coordinator);
- the interactive establishment on a server system of a (logically consistent) standing offer (known as a PEP Proposal) to buy one or more chosen items on certain terms and conditions (the Purchase Terms) as part of a single purchase order;
- the assignment of a unique identifier by the server system to that PEP Proposal;
- the communication of the PEP Proposal to a plurality of potential participants (Invitees) who use one or more client systems;
- the automatic evaluation and administration of the Invitees' responses by the server system, which ensures those responses are consistent with the terms of the PEP Proposal; and
- the completion of the purchase in the event that the terms of the PEP Proposal are satisfied, and the termination of the offer in the event that they are not.

The preferred embodiment of the present invention enables customers to establish purchase terms, interactively with the server system, which ensure that the correct amount will be raised (i.e. there will be no surplus or shortfall) and that the participants will contribute appropriate amounts to the overall total through the use of various contribution methods.

Embodiments of the invention employ various evaluation mechanisms to check the purchase terms for logical errors that will prevent them from being fulfilled. Logically inconsistent purchase terms are not allowed to proceed, and the system assists the customers to remove logical flaws.

The exemplary embodiment of the invention preferably provides each Invitee an opportunity to view and approve the suggested purchase item or items before making the purchase, and ensures that acceptances are consistent with the Purchase Terms.

The preferred embodiment allows participants to contribute their payments individually by using their own client systems, and enables the transfer of value from the customers to the vendor to be delayed until a sufficient number of people have committed to purchase the item or items in accordance with the Purchase Terms.

One embodiment assesses the progress of the PEP Proposal through the use of a series of algorithms which enable it to identify whether the Purchase Terms have been: completed successfully, are unsuccessful, or cannot be successful. Lastly it coordinates the administration of orders and assists in the delivery of the items once purchased.

Embodiments of the invention are generally implemented in software and installed on a server system of a retailer who already has an electronic commerce portal established for selling their products or services. The performance of the invention in this aspect is accordingly effected by the retailer's server system. In another aspect of the invention, the software may be installed and executed by a server system not belonging to a retailer. In another aspect, the performance of the invention resides in the purchasing steps executed by a purchaser (also termed herein the Coordinator or prospective purchaser or proposal originator) who interfaces with the retailer's server to conduct the pooled purchasing. Although the software for enabling the purchaser to create the purchase proposal resides on the server system, the inventive interaction of the purchaser's computer system with the server is effected and enabled by that software.

D. BRIEF DESCRIPTION OF THE DRAWINGS

FIGS. 5A, 5B and 5C are simplified block diagrams showing the elements that might be present on typical web pages that assist the Coordinator to establish logically consistent Purchase Terms when different contribution methods have been selected.

FIGS. 8A, 8B and 8C are simplified block diagrams showing the elements of possible individual response pages under different Purchase Term scenarios.

E. DETAILED DESCRIPTION OF EXEMPLARY EMBODIMENTS

1. Network environment

Figure 1:
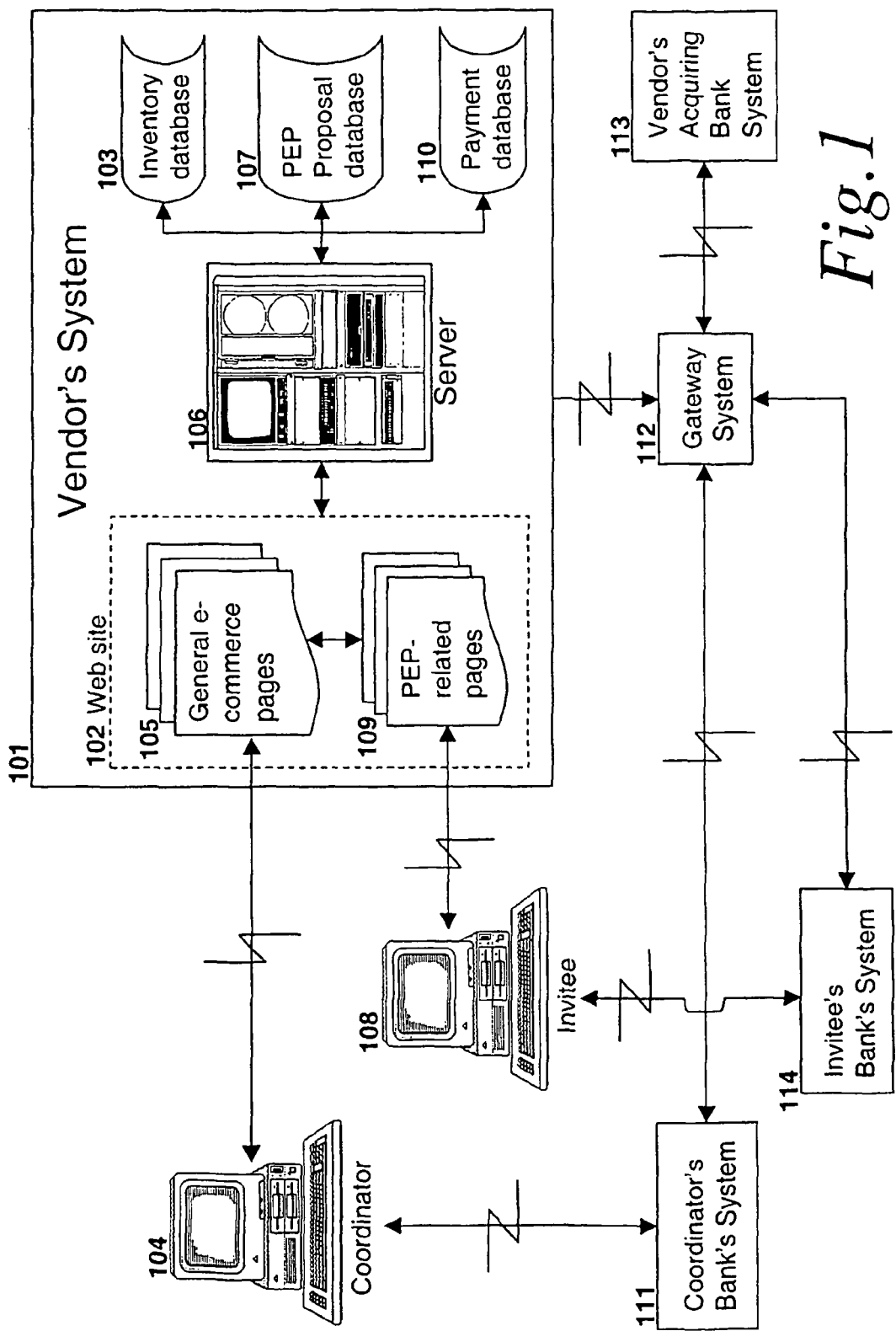
FIG. 1 is a functional block diagram of one network environment which is particularly well suited to the present invention.

FIG. 1 is a functional block diagram of one network environment which is particularly well suited to the present invention. The diagram depicts a Vendor's System 101, which offers a pooled electronic purchasing service to the world at large. The Vendor's System is comprised of the server architecture 106 responsible for managing and processing the information required by the present invention. It also includes a web site 102, which contains the vendor's general e-commerce pages 105 and the pages associated with the present invention 109. Also located on the server system are three databases:

(i) an inventory database 103 which contains information regarding the levels of stock and ordering requirements and which may allocate particular items to particular customer orders;

(ii) a PEP Proposal database 107 which contains the non-financial information relating to each of the PEP Proposals, including the details of the Invitees, the Purchase Terms, the administrative details, and records of the Invitees' responses; and (iii) a payment database which may include credit card and other details (see below) 110.

Examples of database systems that can be used by the Vendor's System 101 to maintain the information include Microsoft Corporation's Access 7.0/2000 or Oracle 9i by Oracle Corporation. The information contained in such databases are manipulated by software applications created using server-side scripting languages such as Microsoft's ASP, Allaire Corporation's Coldfusion. The Vendor's System 101 may be more complex than depicted (for example, the database may be distributed across many servers). Alternatively, it may be simpler than the one depicted (for example, it might combine the three separate databases into a single system).

In FIG. 1 two customers, the Coordinator (who initiates the PEP) and the Invitee, use their respective client systems (104 and 108) to access the Vendor's web site 102 via communications networks. Although only two customers are depicted here, there is no limit on the number of customers who can participate in a Pooled Electronic Purchase.

The present invention can utilise many different types of communications networks. For example, a proprietary Wide Area Network (WAN) or a public WAN such as the Internet may be used. These networks typically employ various protocols such as the HyperText Transfer Protocol (HTTP), Extensible Markup Language (XML), Voice over Internet Protocol (VoIP) and the Internet Protocol/Transfer Control Protocol (TCP/IP) to transfer information between remote computer systems—often through the use of services such as the World Wide Web and email.

The present invention might also utilise wireless networks, including those utilising Global System for Mobile (GSM), Code Division Multiple Access (CDMA) or Time Division Multiple Access technology, and the Wireless Application Protocol (WAP). The present system and method can utilise any, or any combination of, such communications networks. As such, although the client systems (104 and 108) are represented as being personal computer systems, any electronic device capable of interfacing with a communications network may be used, including personal digital assistants (Palm pilots, Handspring Visors and the like) and mobile phones etc.

Where the client system is a personal computer, that system may include a web browser such as Navigator 6.0 by Netscape or Internet Explorer by Microsoft Corporation that can be used to display HyperText Markup Language (HTML) documents sent by the server system. Such browsers can utilise client-side scripting languages such as Javascript and VB Script to traps user errors on the client machine, and to manipulate the client document before being sent back to the server. This is more efficient than relying on server side scripting only. The Vendor's System receives HTTP requests to access web pages on the web site identified by URLs and provides the web pages to the client systems in response. Information distribution is controlled through the use of a server-side scripting language such as Microsoft Corporation's ASP or Allaire Corporation's Coldfusion. The Coordinator, the Invitees and (later) the Participants would have access to certain portions of the information contained on the inventory database 103 and the PEP Proposal database 107 via PEP-related pages on the vendor's web site 109 such as the Individual Response Pages and the Status Pages (discussed below). This information may be password protected.

The present invention administers the transfer of value from the customers to the vendor in the event that the PEP Proposal is completed, and the goods and services are purchased jointly. The value transfers effected using the present invention can be made using a variety of electronic payment systems, including credit cards, debit cards, charge cards, smart cards, digital or electronic cash or cheques. However, for the sake of convenience, the present invention is described using credit and charge card payment systems as examples. As such, FIG. 1 depicts a number of systems that may be used to administer the transfer of value from the Coordinator 104 and the Invitee 108 to the Vendor 101. These include the Coordinator's Bank System 111, the Invitee's Bank System 114, the Vendor's Acquiring Bank System 113 and the Gateway System 112. The function of each of these entities is described in more detail under the heading "payment administration" at section 6 below.

In an alternative embodiment, the invention may be performed through a server separate to the vendor's system. In this case, the PEP functionality of server 106 described above is handled by a separate PEP server (not shown) which provides the PEP-related pages 109. Additionally, the payment database 110 and PEP proposal database 107 interfaces directly with the PEP server, which in turn interfaces with the vendor system 101. In this embodiment, the PEP server interfaces with the gateway system 112 to effect payment from the participants. The PEP server then provides delivery information (if necessary) to the vendor system 101 and pays the purchase price to the vendor, less a small commission or flat fee. This embodiment otherwise generally operates similarly to the embodiment shown in, and described in relation to, FIG. 1.

2. Overview

Figure 2:
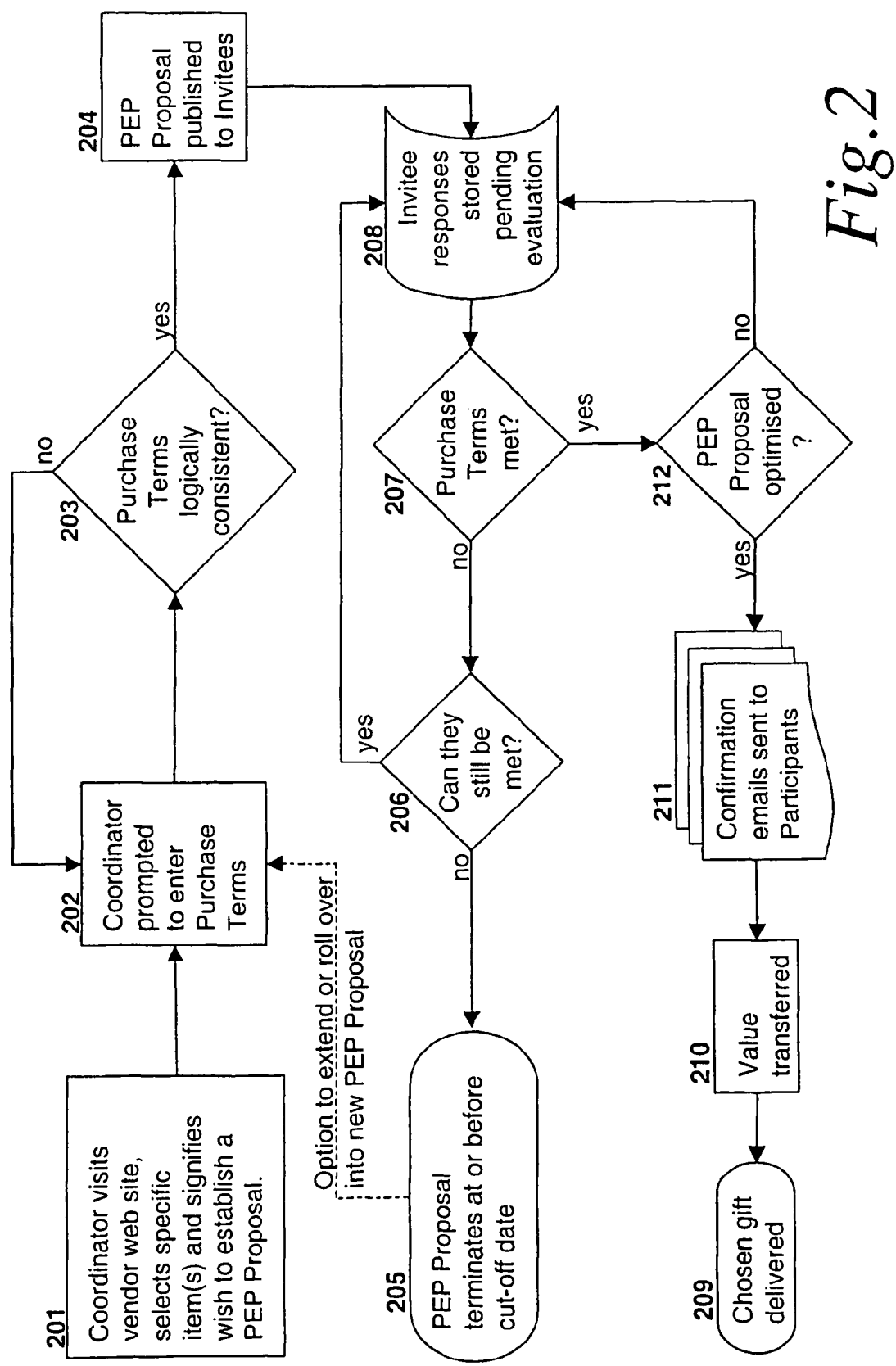
FIG. 2 is a simplified flow diagram providing an overview of one embodiment of the present invention.

FIG. 2 is a simplified flow diagram providing an overview of the process. The process begins when the Coordinator visits a vendor's web site, selects a specific item or items to be purchased jointly and signifies a wish to establish a PEP proposal 201. A PEP Proposal is a standing offer to purchase a specific item or items jointly. Such items may be any good or service where the price is set by the Vendor rather than the Participants.

Figure 3:
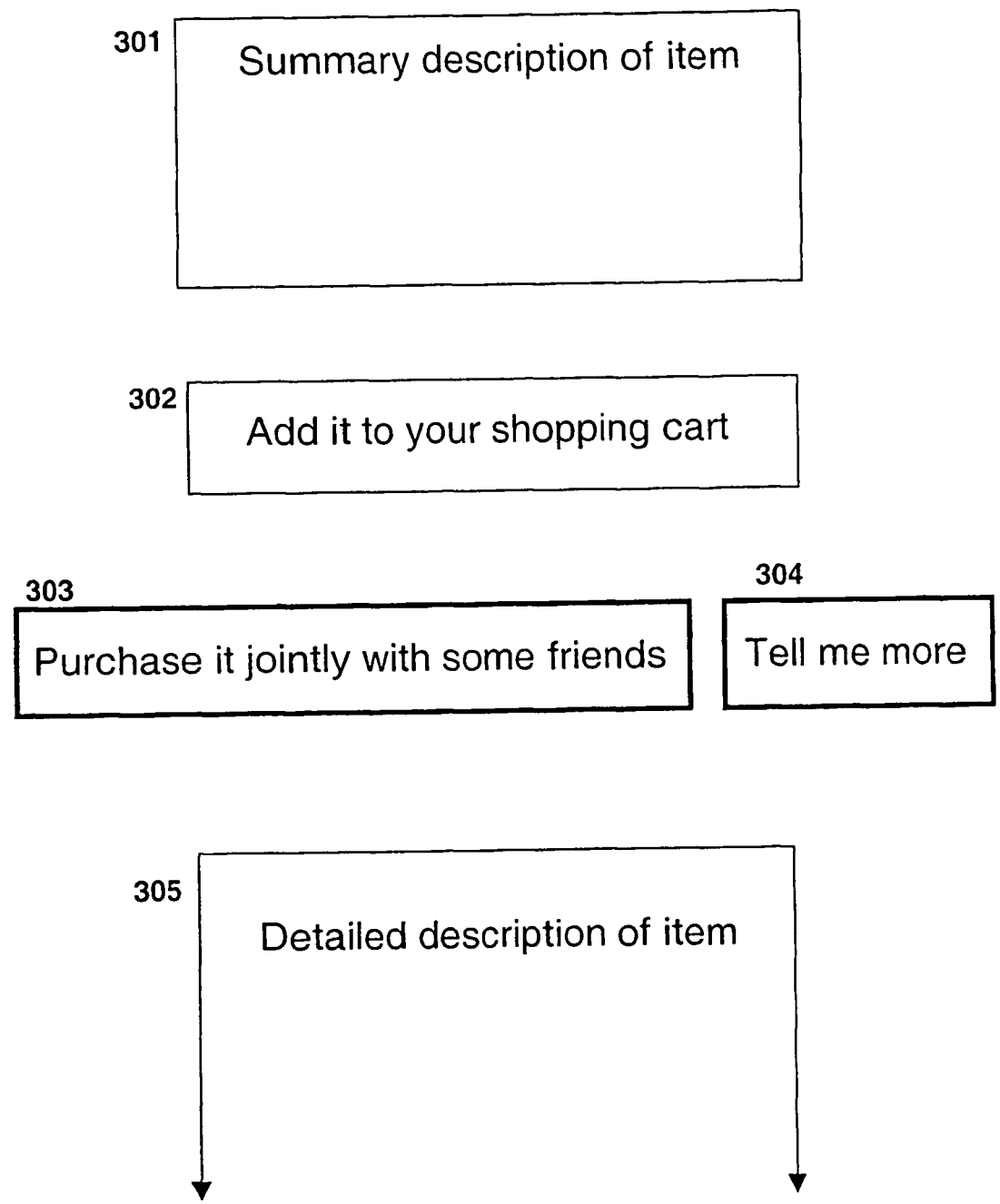
FIG. 3 is a simplified block diagram showing the elements that might be present on a typical web page displaying an item for sale.

FIG. 3 illustrates an example of a web page that would be sent to the Coordinator's client system by the vendor's server system in this part of the process 201. There is a summary description of the item 301, a detailed description of the item 305, and an option to commence a conventional "shopping cart" purchase 302. A customer commences a Pooled Electronic Purchase by clicking on the dedicated button 303. A button enabling the Coordinator to obtain an explanation of the invention might also be provided 304. One skilled in the art would be familiar with the use of such buttons on web pages and would appreciate that the various sections described can be omitted or rearranged or adapted in various ways.

A Coordinator accessing the present invention by clicking on the relevant option 303 would be taken to a shopping cart-type web page, where he or she would be given the opportunity to confirm the selection, or to continue shopping. Such a web page would utilise conventional shopping cart technology and is therefore not described here.

After the Coordinator is satisfied with the item or items chosen, he or she then indicates an intention to proceed with a PEP proposal. The server system 106 (or alternatively a separate PEP server) assigns a temporary code to this potential PEP Proposal and takes the Coordinator through a series of questions to establish the Purchase Terms at step 202.

Figure 4:
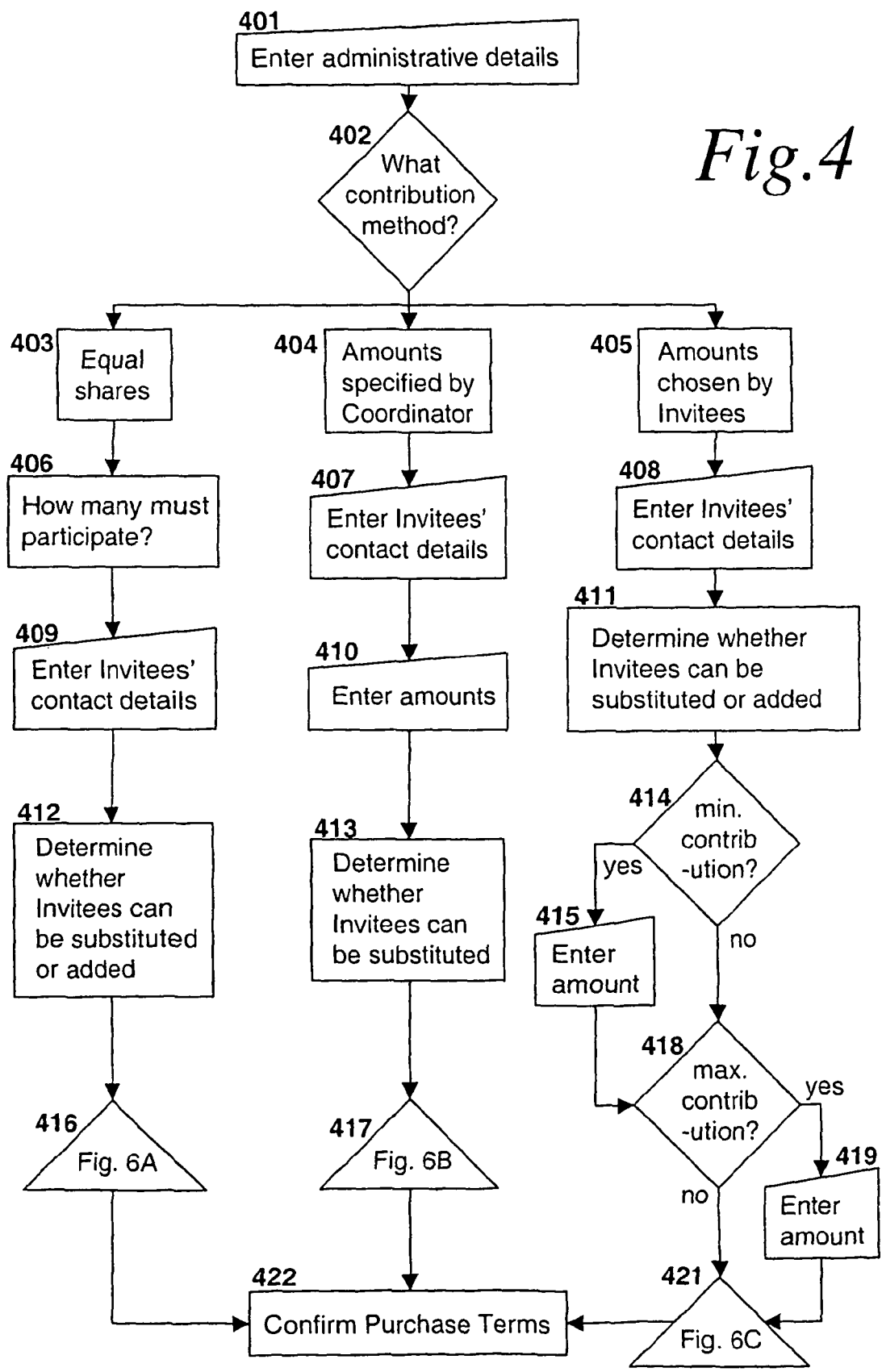
FIG. 4 is a flow diagram illustrating the process by which the server system can assist the Coordinator to establish the Purchase Terms for a new PEP Proposal.

Under this embodiment, the Purchase Terms will include details such as the amount that each Invitee will be asked to contribute, as well as administrative details such as the name of the recipient and shipment information etc. FIG. 4 is a detailed flow diagram illustrating the process by which the server system can assist the Coordinator to establish the Purchase Terms in one embodiment of the invention. FIGS. 5A, 5B and 5C are simplified block diagrams depicting web pages that might be downloaded by the Coordinator's client system 104 at step 202.

The server system then uses a series of algorithms to check that the Purchase Terms are logically consistent at step 203. Purchase Terms are logically consistent if a purchase will result when their terms are satisfied. Conversely, Purchase Terms are logically inconsistent if a purchase will not result even though they are satisfied. It is desirable for the Vendor's System to ensure that the Purchase Terms are logically consistent before it is allowed to proceed. This ensures that the Invitees and the Vendor's System do not waste their time and resources responding to a PEP Proposal that cannot result in the purchase of a gift. If the Purchase terms are not logically consistent (203=no), the server system asks the Coordinator to re-enter them at step 202, and may assist him or her in this process. If the Purchase Terms are logically consistent (203=yes), a unique identifier is assigned to the PEP Proposal and stored in the relevant database 107 (not illustrated) and the process is allowed to proceed at step 205. The algorithms used to check the logical consistency of the Purchase Terms, depicted in FIGS. 6A, 6B and 6C, and are discussed in greater detail in section 3(d).

The process proceeds when the PEP Proposal is published to the Invitees nominated by the Coordinator at step 204. Depending upon the circumstances of the purchase, the PEP Proposal might be published directly or indirectly to the Invitees. Where the purchase is between a group of strangers (such as the purchase of equipment for charitable purposes on behalf of an aid agency) the PEP Proposal might be published using indirect marketing methods such as print or web advertising. Where the purchase is between a group of friends, the PEP Proposal would be published directly to the Invitees, perhaps by e-mail or by (Short Message Service) SMS text to a cellular mobile phone utilising technologies such as GSM, CDMA or TDMA.

The Invitees then respond to the PEP Proposal, and the server system stores their details pending evaluation at step 208. Where the PEP Proposal has been communicated to the Invitees by email at step 205, the Invitees could respond by clicking on a hyperlink to a unique Individual Response Page on the server system which has been inserted into the email. This Individual Response Page could explain the nominated Purchase Terms to each Invitee, and ask them to agree to these terms. FIGS. 8A, 8B and 8C provide examples of possible Individual Response Pages in one embodiment of the invention, and these diagrams are discussed in greater detail in section 4 below.

Figure 9:
FIG. 9 is a block diagram showing a possible payment acceptance page that can be used for alternative Purchase Term combinations in one embodiment.

Broadly speaking, those Invitees who wish to participate (thereby becoming Participants) will signify their agreement to do so and then provide their credit card or other electronic payment system details. These details are stored by the vendor, or a third party and the vendor at step 208. It is necessary for the server system to ensure that the acceptances provided by the Participants are consistent with, or fall within, the Purchase Terms. FIG. 9 provides an example of a payment acceptance page that can be used to achieve this goal during this part of the process, and this is discussed below.

The server system periodically evaluates the Invitee responses and non-responses by using a series of watchdog algorithms. In the preferred embodiment of the present invention, this is not a continuous process, but is done upon the occurrence of periodic events, such as the receipt of each new Invitee response, or at the change of date. The algorithms—which are illustrated in detail in FIGS. 10A, 10B and 10C—will vary according to the Contribution Method chosen by the Coordinator. Their chief purpose is to determine whether the terms of the PEP Proposal have been met, but they are also designed to ensure that the PEP Proposal is optimised for the Participants, and to ensure it is terminated at an appropriate time. These concepts are discussed in greater detail in section 5 below.

Where the terms of a PEP Proposal have not been met (207=no), and there is no possibility that they can be met (206=no) the PEP Proposal terminates at or before the cut-off date at step 206 (although there might be an option for the Coordinator to extend the proposal or to recommence another proposal along similar lines). The Participants are able to check the progress of the process at any stage by downloading a status page from the server system.

Where the terms of the PEP Proposal have been met (207=yes), and the terms have been optimised for the Participants (212=yes), confirmation e-mails are sent to the Participants at step 211, and there is a value transfer to the vendor at step 210. There are a number of ways in which the vendor could store and deal with the payment details provided by customers and the progress of orders taken using the present invention. The vendor would need to address a number of problems that could potentially arise if the standard 'real time' authorisation procedures for credit cards is used. If an Invitee's credit card is charged as soon as the Invitee provides his or her details, this amount would need to be refunded if the Purchase Terms are not met by the cut-off date at step 205. If the Invitee's credit card is not charged until the Purchase Terms are met at step 211 it is possible that authorisation will be withheld by the Invitee's bank, perhaps because the Invitee's credit limit has been exceeded at that point in time or because the credit card has expired. In the preferred embodiment of the present invention, the transfer of value is effected using the mechanism of direct debit pre-authorised payments. This allows the vendor to place a "hold" over a specified portion of each Participant's credit limit pending the completion (successful or otherwise) of the PEP Proposal. If the PEP Proposal is completed successfully, the value transfer occurs at step 201. If the PEP Proposal is not completed successfully at step 205, the credit card is never charged, and the hold expires. This avoids the potential problems identified above.

Once there has been a value transfer, the selected item or items can be delivered automatically at step 209. This step is discussed in more detail at section 7 below.

3. Establishing the Purchase Terms

FIG. 4 is a detailed flow diagram illustrating a process by which the server system can assist the Coordinator to establish logical Purchase Terms interactively. Those familiar with the art will appreciate that the process depicted in FIG. 4 can be undertaken in one or more steps by the server system. Further, with one exception, the information captured by the server system during this stage can be captured in a different order from that depicted.

In the embodiment described below, the server system assists the Coordinator to establish the Purchase Terms by sending four separate web pages to the Coordinator's client system. The content of these pages will vary depending upon the various selections made by the Coordinator during the process.

a) Administrative details

The first page sent to the Coordinator at this stage of the process elicits the administrative details at step 401. The total cost of the purchase must be ascertained by the completion of this step. The total cost includes not only the price of the chosen item or items, but also any associated taxes and imposts, delivery costs, greeting card and wrapping charges. Ascertainment of the total cost enables the correct division of the purchase between the Participants. Therefore, it is necessary to ascertain:

i) the address for delivery;
ii) the last delivery date, or delivery method (overnight courier, ordinary mail, or pick up etc);
iii) whether a card is to be delivered with the gift and (optionally) the choice of card; and
iv) whether any wrapping is required, and the choice and cost of that wrapping.

It is desirable for the server system to include a database with information on the various delivery charges, and taxes and imposts associated with deliveries into specific regions, provinces, states or countries. These additional charges could be added automatically to the total price. However, this information may not be readily available, or it may be difficult to keep such information up to date. If the vendor's system cannot access this information immediately (which is desirable) there are two alternatives. The first involves obtaining a personal undertaking from the Coordinator to pay for additional unforeseen charges. The second involves waiting for this information to become available.

In addition to the above information, the server system may optionally seek the following information from the Coordinator:

v) the details of the occasion (i.e. Birthday, Christmas, Wedding etc);
vi) the cut-off date for the Invitees' responses;
vii) whether the status page is to be password protected, and if so, the password; and
viii) the name of the ultimate recipient.

As this information can all be obtained, by utilising conventional web-based know how, this page is not described or depicted here.

b) Contribution methods

Once the total price has been ascertained, the server system then ascertains which contribution method is preferred by sending a second page to the Coordinator at step 402. A Contribution Method is a method for dividing up the exact purchase price amongst the Participants. In the preferred embodiment of the present invention, there are three different Contribution Methods. These allow for payments:

(i) in equal shares (step 403). This is where two Participants pay half each, three pay thirds, four pay quarters, and so on;
(ii) in unequal amounts specified by the Coordinator (step 404). The individual contributions might be of any amount, providing that together they add up to the total price. For example, Participants A, B and C might be asked to contribute $40, $20 and $20 respectively, or perhaps $40, $25 and $15 towards an $80 item;
(iii) in unequal amounts chosen by the Invitees (step 405): Each Invitee is free to nominate the sum they would like to contribute. In one embodiment of the invention, the PEP Proposal will end successfully as soon as the required amount is raised.

The Vendor's System can use these Contribution Methods to assist the Coordinator to set the individual contributions, while at the same time ensuring that these contributions exactly add up to the total purchase price.

(i) Equal shares

Where the Coordinator specifies that the Invitees will be asked to contribute in equal shares at step 403, he or she will then be asked how many people must participate in the purchase at step 406. This information will determine the amount (or a range of amounts) that each Participant will ultimately be liable to pay. The Coordinator can nominate a set number, maximum, minimum, or maximum and minimum number of Participants. Where a set number of Participants has been selected, the server system can calculate the exact amount of each Participant's contribution in advance. Where the Coordinator specifies a minimum, maximum or minimum and maximum number of Participants, the server system will calculate a range of amounts that would be payable by the Participants.

The Coordinator is then asked to enter the Invitees' contact details at step 409. These details may include the name and e-mail address or mobile phone number. The mobile phone number may be used by the server system to contact Invitees using an SMS text through their mobile phones. Initially, this information is necessary to ensure that the Invitees receive the Coordinator's invitation.

In the preferred embodiment, the server system will then ask whether these Invitees can be substituted (i.e. replaced), or whether additional people can be asked to participate in the purchase at a later time at step 412.

The server system must ensure that the Purchase Terms are internally consistent. For example, where a minimum number of five Invitees are asked to contribute equal amounts at step 406, the Coordinator must have nominated at least five invitees at step 412, or else allowed additional invitees to be added at a later stage at step 412. The server system evaluates the Purchase Terms using the relevant logical evaluation algorithm at step 412. This algorithm is depicted in detail at FIG. 6A and is discussed in detail below.

If the purchase terms are logically consistent, the Coordinator confirms them at step 422.

FIG. 5A depicts a web page that might be sent to the Coordinator in one embodiment. It contains elements that enable the server system to ascertain personal and contact details of the Coordinator (fields 501, 502, 503 and 504). The server system then asks the Coordinator whether he or she will become a Participant (505 and 506). By choosing the appropriate radio button 506, the Coordinator does not need to enter his or her own name at the next stage 507. The Coordinator then enters the first name 513, last name 514 and email address 515 of each Invitee. In the embodiment depicted, the server system can transfer the entered information to the entry box below 517 using a client-side script (such as Java Script or VB Script) when the Coordinator clicks on the "add" button at 516. The Coordinator can amend any errors in the information added by the Coordinator selecting the "Edit" button 518. If the Coordinator changes her mind, the Invitees can be removed 519. The Coordinator is also given an option to view his or her address book 520. This option is discussed in detail in section 3(c) below. Options are given to substitute (521 and 522) and to add Invitees (523 and 524). There is an option to obtain answers to possible questions 526, and to go back to the first page 525 or to continue to the next 527. One skilled in the art will be familiar with the use of radio buttons and client-side scripts.

(ii) Unequal amounts specified by the Coordinator

Where the Participants contribute amounts that are specified by the Coordinator at step 404, he or she is asked to enter the Invitees' contact information at step 407. A number of methods for entering these amounts are discussed in paragraph 3(c) below.

The Coordinator enters the amounts that are to be paid by each Invitee at step 407.

The Coordinator is asked whether the named Invitees can be substituted at a later stage 413. Under this Contribution Method, it is possible to add new Invitees providing that the individual, contribution amounts add up to the total price. This may be achieved by (for example) splitting one or more of the original contribution amounts among the additional Invitees. However, for present purposes, the only option presented in FIG. 4 is the substitution of the Invitees, with the new Invitee paying the amount nominated for the Invitee that is being replaced at step 413. This is a much simpler option.

The amounts to be paid by each Invitee must add up to the total price, and this is verified by an evaluation algorithm at step 417. This algorithm is illustrated in detail in FIG. 6B. Once the Purchase Terms have been assessed and approved by this algorithm, the Coordinator confirms the Purchase Terms at step 422.

FIG. 5B depicts a web page that might be sent to the Coordinator in one embodiment of the invention. Similar to FIG. 5A, it contains elements that enable the server system to ascertain personal and contact details of the Coordinator (fields 528, 529, 530 and 531). The Coordinator is asked whether he or she will become a Participant (532 and 533). By choosing the appropriate radio button 533, the Coordinator does not need to enter his or her own name at the next stage 534. The Coordinator then enters the first name 535, last name 536 and email address 537 of each Invitee. In contrast to FIG. 5A, the Coordinator is also asked to enter the suggested individual contribution amount for each named Invitee 538. The server system transfers the entered information to the entry box below 540 when the Coordinator clicks on the "add" button 539. If there are errors in the information added, this can be amended by the Coordinator selecting the "Edit" button 542. If the Coordinator changes his or her mind while establishing the PEP Proposal, the Invitees can be removed 543. This option is discussed in detail below. The Coordinator is also given an option to view his or her address book 544. The entered individual contribution amounts 538 might be added up and displayed on the web page 541, perhaps with a comparison of the total price. If the Coordinator is unable to ensure that the total suggested contributions add up to the total price, he or she may opt to have the server system suggest contribution amounts instead 545. Options are also given to substitute Invitees (546 and 547), to obtain answers to possible questions 549, and to go back to the first page 548 or to continue to the next 550.

(iii) Unspecified amounts chosen by the Invitees'

Where the Participants are asked to contribute amounts of their choice 405 the Coordinator would be asked to enter the Invitees' contact information 408 and to stipulate whether these people can be substituted or whether additional people can be added 411.

The Coordinator is asked whether there will be a minimum contribution 414, and if there is, to select that amount 415. He or she is also asked whether there will be a maximum contribution 418, and if there is, to select that amount 419.

It is possible that the Coordinator might try to stipulate a maximum individual contribution but an insufficient number of Invitees to raise the total purchase price. This would render the PEP Proposal incapable of being completed (i.e. it would be logically inconsistent). Accordingly, the Purchase Terms must be assessed by a logical evaluation algorithm 421. This algorithm is depicted in FIG. 5C and is discussed in detail below.

The process culminates with the Coordinator confirming the Purchase Terms 421.

FIG. 5C depicts a web page that might be sent to the Coordinator in one embodiment of the invention. As with FIGS. 5A and 5B, it contains elements that enable the server system to ascertain personal and contact details of the Coordinator (551, 552, 503 and 554). The server system then asks the Coordinator whether he or she will become a Participant (555 and 556). By choosing the appropriate radio button 556, the Coordinator need does not need to enter his or her own name at the next stage 557. The Coordinator then enters the first name 558, last name 559 and email address 560. The server system transfers the entered information to the entry box below 562. If there are errors in the information added, this can be edited by the Coordinator selecting the "Edit" button 563. If the Coordinator changes her mind, the Invitees can be removed 564. The Coordinator is also given an option to view his or her address book 565. This option is discussed in detail below. Options are given to substitute (566 and 567) and to add Invitees (568 and 569). There is an option to obtain answers to possible questions 571, and to go back to the first page 570 or to continue to the next 572.

c) Entering the Invitees' details

Under each of the scenarios outlined above, the Coordinator is asked to provide the contact information for each of the Invitees to the server system (407, 408 and 409). The precise nature of this contact information will vary according to the technology used by the server system and the communication method selected by the Coordinator. An e-mail might be sent to the Invitees, who could download that message using a desktop client system or a WAP enabled portable device. In these cases, the contact information will include the Invitees' e-mail addresses. Another way in which the PEP Proposal may be communicated to the Invitees is through the use of SMS text to a cellular mobile phone. In these cases, the Invitees' contact information will include the relevant telephone numbers. The server system might offer one of, or a combination of, such methods.

As discussed above, the Coordinator might enter each Invitee name and address manually (513-516, 535-539, 558-561). This has the disadvantage of being a relatively slow process. Further, it is possible that the Coordinator could enter incorrect details by mistake. The server system could assist by up-loading the Coordinator's personal email address book directly from his or her dedicated e-mail program at the request of the Coordinator (520, 544, 565). It would do so by downloading a self-executing program that searches for the address book file associated with the Coordinator's e-mail program, and then up-loading that file to the server system. The addresses could then be displayed on a new web page. The Coordinator could indicate who will be asked to contribute by ticking the relevant contact information. Alternatively, Coordinators might store lists of contact information for their friends and relatives specifically for use in conjunction with the present system and method. This information might be stored on their own client systems or on remote server systems (either the vendor's or another system), ready to be accessed when desired. Each of these alternative methods has the advantage of being faster and more accurate than manual entry.

d) Logical evaluation algorithms

As discussed, it is important for the Server System to ensure that the Purchase Terms established by the Coordinator are logically consistent. This ensures that the Invitees and the Vendor's System do not waste their time and resources responding to a PEP Proposal that cannot result in the purchase of a gift.

The evaluation algorithms would be implemented by the server system using a server-based scripting language, possibly in conjunction with a client-based script. Those skilled in the art will know that the elements of the evaluation algorithms can be employed in a different order from that shown.

(i) Evaluation algorithm for purchase in equal shares 416

Where the Coordinator has specified that the Invitees will be asked to contribute in equal shares at step 403, he or she must specify the required number of Participants at step 406. Where the number of Invitees nominated by the Coordinator is greater than the set or minimum number of Participants nominated at step 406, it is clear that the PEP Proposal has a chance of being completed successfully (i.e. it is logically consistent). If this is not the case, it is possible that the PEP Proposal cannot succeed (i.e. the Purchase Terms may be logically inconsistent).

Figure 6A:
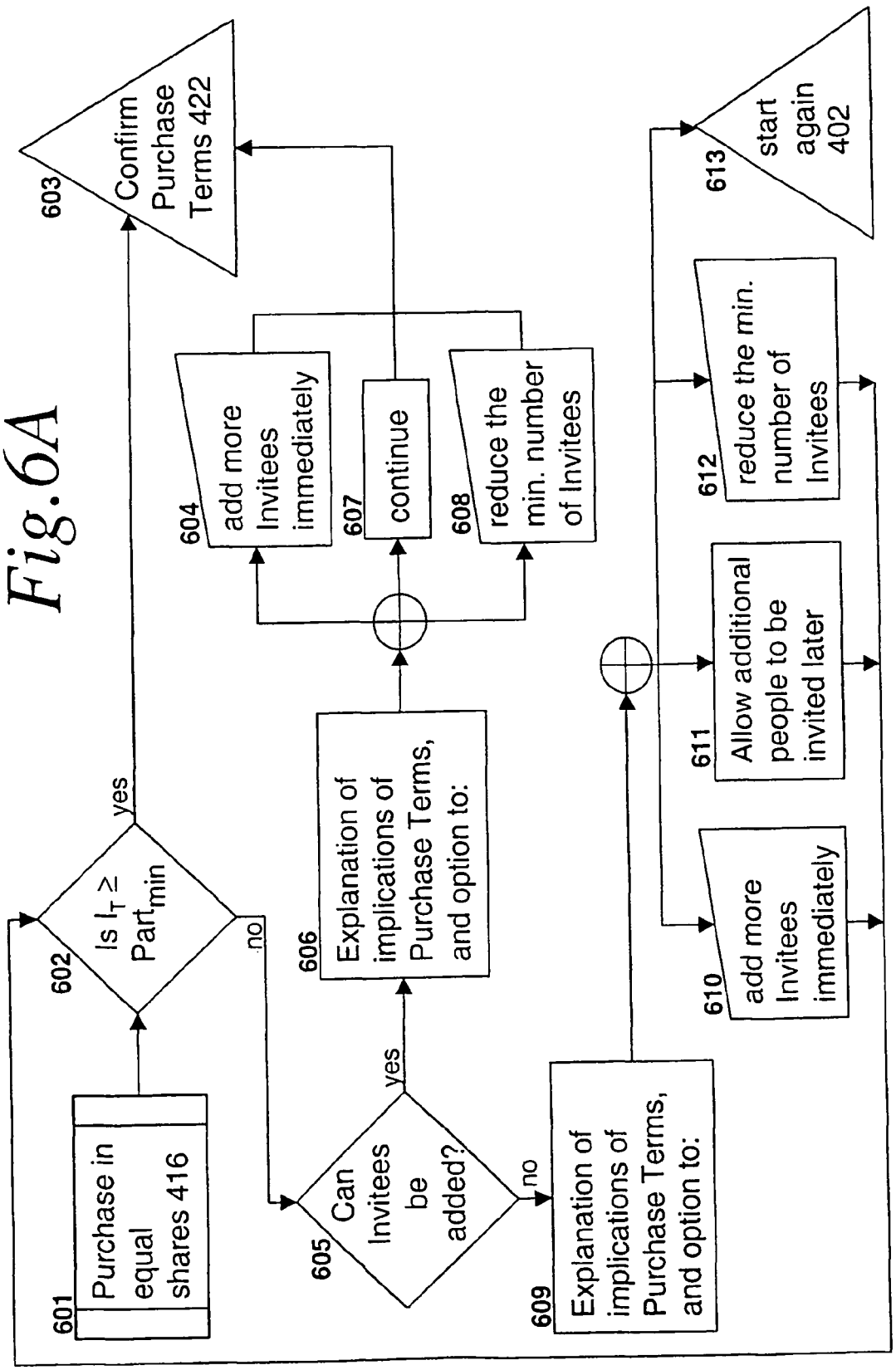
FIGS. 6A, 6B and 6C are flow diagrams illustrating algorithms that can be used to check whether the Purchase Terms established by the Coordinator are logically consistent for different contribution methods.

The Logical Evaluation Algorithm depicted in FIG. 6A is designed to assess the logical consistency (or otherwise) of the Purchase Terms in these circumstances 601.

The server system determines whether the total number of Invitees ($I_T$) is greater than or equal to the set or minimum number of required Participants ($Part_{min}$) (specified at 406) at step 602. If it is (i.e. if 602=yes), the Purchase Terms are logically consistent, and the Coordinator is asked to proceed to step 603 by confirming the Purchase Terms. If not (i.e. if 602=no), the Purchase Terms might be logically inconsistent. The server system then determines whether additional Invitees can be added at step 605 (as specified by the Coordinator at 412). If additional people can be invited (i.e. if 605=yes), the Purchase Terms can be met as long as they are invited before the cut-off date. In other words, the Coordinator might have specified that a minimum of four people must participate in the purchase, but may have named only three Invitees. This would not be fatal to the PEP Proposal if additional people are invited before the cut-off date and four of them agree to participate. The server system explains the implications of the chosen Purchase Terms to the Coordinator at step 606, who would then be given the option to add more Invitees at step 604, reduce the minimum number of Invitees at step 608, or proceed without making any changes at step 607.

After choosing one of these options, the Coordinator is asked to proceed to step 603 where the Purchase Terms are confirmed.

Where the number of Invitees is less than the minimum required number of participants (602=no), and where there is no provision for additional Invitees to be added (605=no), the Purchase Terms are logically inconsistent, and this must be explained to the Coordinator at step 609. The Coordinator is then given the opportunity to rectify the Purchase Terms by adding more Invitees immediately at step 610, allowing additional people to be invited at a later stage at step 611 or reducing the required minimum number of Invitees at step 612. If the Coordinator takes one or more of these options, the new Purchase Terms are re-evaluated by the logical evaluation algorithm at step 602. On the other hand, the Coordinator may decide to start again 613, and in this case, he or she would be asked to choose a Contribution Method at step 402.

Figure 6B:
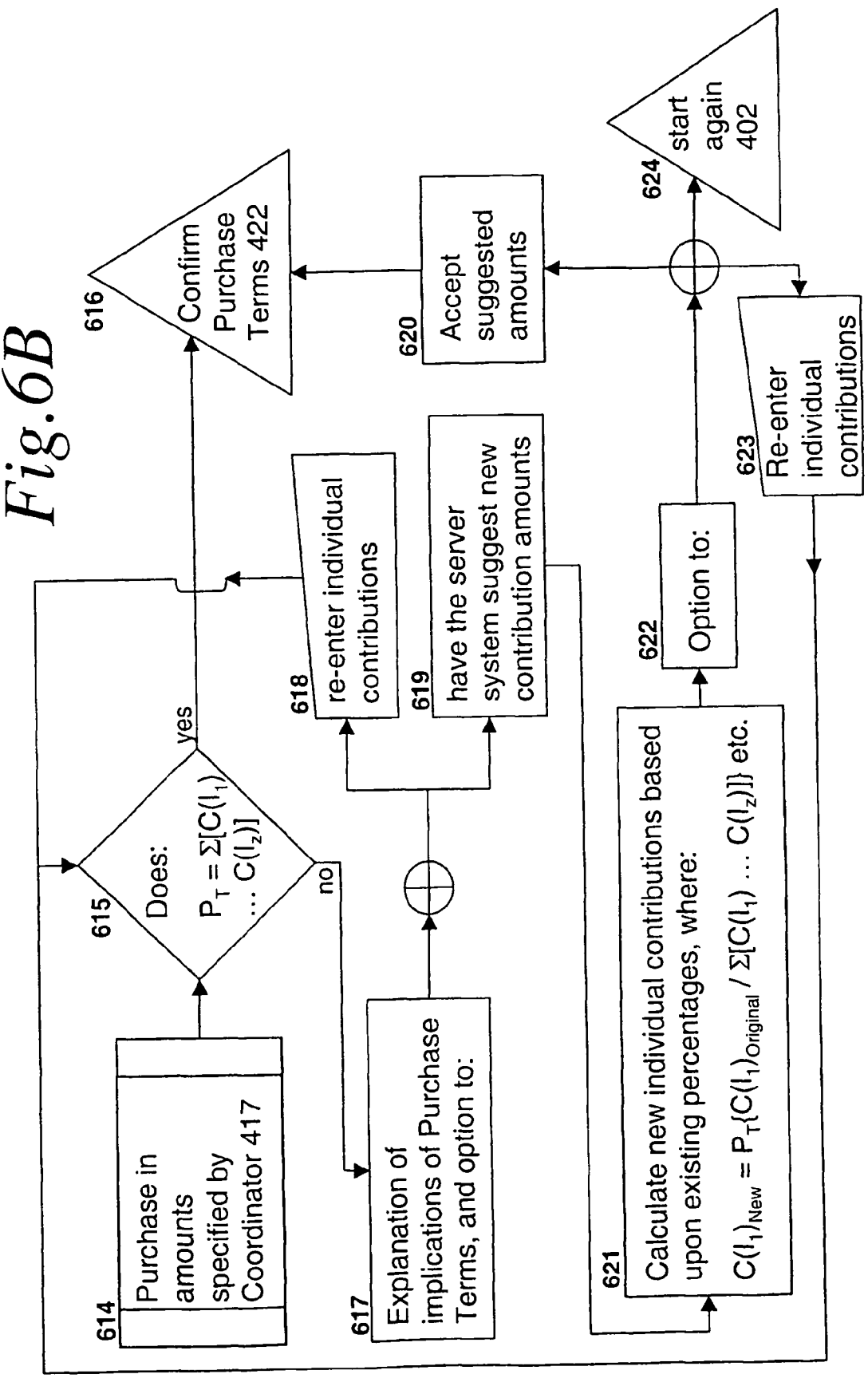

(ii) Evaluation algorithm for purchase in unequal amounts specified by the Coordinator 417

Where the purchase is to be made in unequal amounts specified by the Coordinator at step 404 different considerations determine whether the Purchase Terms are logically consistent or not. The Logical Evaluation Algorithm depicted in FIG. 6B is designed to assess the logical consistency (or otherwise) of the Purchase Terms in these circumstances 614.

Here, the server system must verify that the total price ($P_T$) is equal to the sum of the specified individual contributions ($\Sigma[C(I_1) \ldots C(I_z)]$) (where $C(I_1)$=the specified contribution for the first Invitee and $C(I_z)$=the specified contribution for the last Invitee) at step 615. Where this is the case (i.e. 615=yes), the Purchase Terms are logically consistent and the Coordinator is asked to proceed to step 616 by confirming them.

Where the total price ($P_T$) does not equal the sum of the specified individual contributions ($\Sigma[C(I_1) \ldots C(I_z)]$) (615=no), the Purchase Terms are logically inconsistent, and this must be explained to the Coordinator at step 617. The Coordinator is then given the opportunity to re-enter the individual contribution amounts at step 618 or have the server system suggest new amounts at step 619.

Where the server system is asked to suggest new individual contribution amounts at step 619 it could use a simple formula that suggests new amounts that add up to the total price which are based on the percentages suggested by the original contribution amounts 621. For example, if the original contribution amount for the first Invitee ($C(I_1)_{Original}$) was equal to 10% of the sum of the specified individual contributions ($\Sigma[C(I_1) \ldots C(I_z)]$) the server system can calculate a new contribution amount for this Invitee by multiplying the total price ($P_T$) by 10%.

The Coordinator is then given options at step 622 either to accept the suggested amounts at step 620 or to re-enter the individual contribution amounts manually at step 623. Wherever the Coordinator exercises the option to re-enter the individual contribution amounts manually (623 or 618), the server system assesses the new Purchase Terms afresh at step 615.

(iii) Evaluation algorithm for purchase in unequal amounts chosen by Invitees 421

Figure 6C:
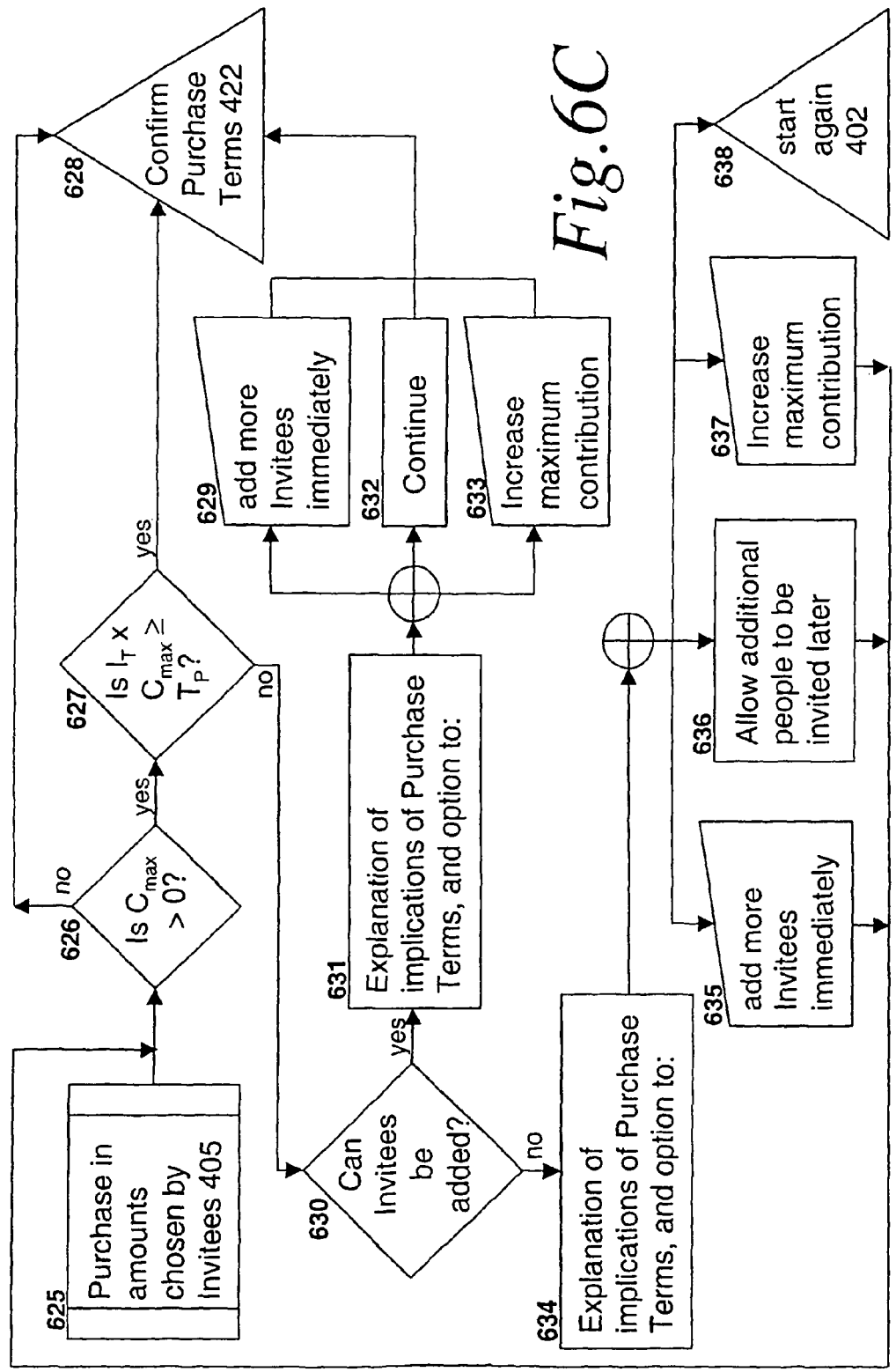

FIG. 6C illustrates a logical evaluation algorithm that can be used to assess the Purchase Terms where the purchase is to be made with amounts chosen by the Invitees at step 625. The server system begins by ascertaining whether the Coordinator has stipulated a maximum contribution ($C_{max}$) (i.e. whether $C_{max}>0$) at step 626.

If there is no maximum contribution (i.e. if 626=no) the Purchase Terms are logically consistent, and the Coordinator proceeds by confirming them at step 628. If there is a maximum contribution (i.e. if 626=yes), the server system then ascertains whether this figure ($C_{max}$) multiplied by the total number of Invitees ($I_T$) is less than the total price ($P_T$) 627. If the maximum amount that can possibly be raised from amongst the nominated Invitees ($C_{max} \times I_T$) is greater than or equal to total price, the Purchase Terms are logically consistent, and the Coordinator is asked to proceed by confirming them at step 628.

On the other hand, if the maximum amount that can possibly be raised from amongst the nominated Invitees is less than the total price, (i.e. 627=no), the server system then determines whether additional Invitees can be added 630 (as specified by the Coordinator at 411). If additional people can be invited (i.e. if 630=yes), the Purchase Terms can be met as long as they are invited to do so and they contribute to the gift before the cut-off date. In other words, the Coordinator might have specified a maximum contribution of $20 and invited four people to participate in the purchase of a $100 gift. If a fifth person joins in and contributes the maximum amount, the PEP Proposal will be successful, but it can only be successful if more people are actually invited. The server system explains the implications of the chosen Purchase Terms to the Coordinator at step 631, who would then be given the option to add more Invitees immediately at step 629, reduce the minimum number of Invitees at step 633 or proceed to step 632 without making any changes.

After choosing one of these options, the Coordinator is asked to proceed by confirming the Purchase Terms at step 628.

On the other hand, if the maximum amount that can possibly be raised from amongst the nominated Invitees is less than the total price, (i.e. 627=no), and additional Invitees cannot be added (639=no) the Purchase Terms are not logically consistent and this must be explained to the Coordinator 634. The Coordinator is then given the opportunity to rectify the Purchase Terms by adding more Invitees immediately at step 635, allowing additional people to be invited at a later stage at step 636 or increasing the maximum contribution at step 637. If the Coordinator takes one or more of these options, the new Purchase Terms are re-evaluated at step 626. On the other hand, the Coordinator may decide to start again at step 638, and in this case, he or she would be asked to choose a Contribution Method at step 402.

e) Confirmation Pages

All of the processes described above culminate in a request for the Coordinator to.confirm the Purchase Terms (422). It is necessary to ensure that the Coordinator clearly understands those terms before proceeding, as these will vary significantly depending upon the precise combinations chosen. This is accomplished when the client system downloads a web page summarising all relevant details relating to the Purchase Terms and the Coordinator signifies a desire to proceed. This is a conventional part of electronic commerce, and is not detailed here.

f) Conclusion

The options for the establishment of the Purchase Terms outlined above in Section 3 are merely examples taken from one embodiment of the invention. Those familiar with the art would be aware that the invention might:

(a) be made less complex, through (for example):
  (i) restricting the number of Contribution Methods made available by the server system (e.g. allowing contributions to be in equal shares or specified amounts only);
  (ii) initially offering a basic choice of selections, and only offering more advanced options after being asked to do so by the Coordinator;
  (iii) reducing the flexibility associated with the above Contribution Methods (e.g. the server system might not allow Invitees to be added or substituted, or where contributions are made in equal shares, it might only allow set numbers of Participants to participate); or
(b) be made more complex, through (for example):
  (i) assisting people to reach a consensus regarding the amounts of their contributions; or
  (ii) allowing "hybrid" Contribution Methods (e.g. by allowing part of the purchase price to be provided by some of the Participants in equal shares, with the balance being provided by Participants contributing amounts of their choice).

The precise configuration of the invention may vary according to the level of sophistication required by vendors and customers.

It is also possible to obtain the required information in a different order from that shown in FIGS. 4 and 5A, 5B and 5C.

4. Administering the Invitee responses

Figure 7:
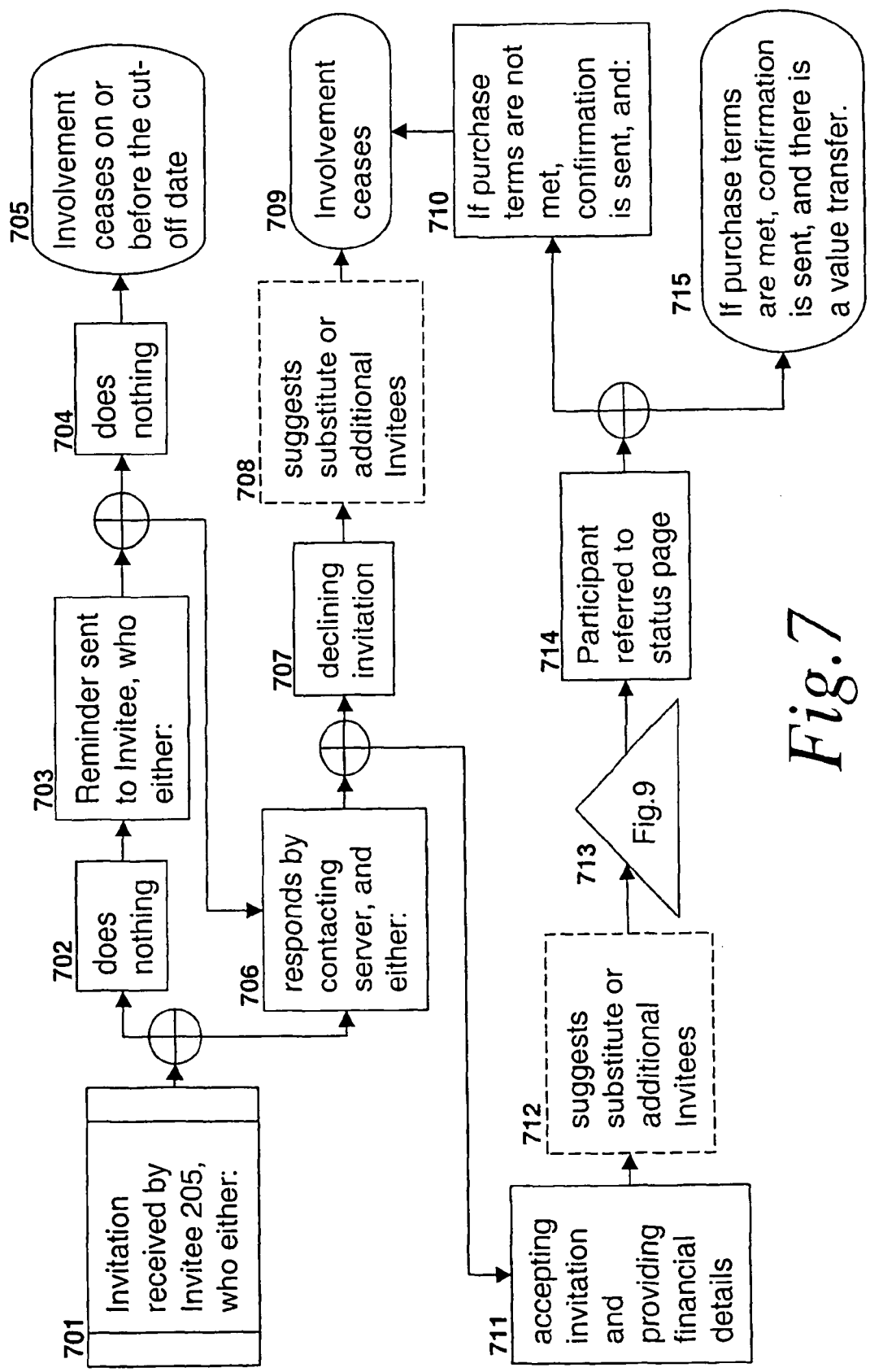
FIG. 7 is a flow diagram providing an overview of how the Vendor's server system handles the responses and non-responses from the Invitees in one embodiment.

Once the PEP Proposal has been established and published, the server system must administer the responses and non-responses from those Invitees. This process is depicted in FIG. 7. As illustrated in that diagram, the invitation is received by each of the Invitees (including the Coordinator where the Coordinator is to be one of the Participants) at step 701.

a) General

If an Invitee does nothing in response to the invitation at step 702, a reminder would be sent to that person in advance of the cut-off date at step 703. At that point the Invitee might still do nothing at step 704 or choose to respond by contacting the server system at step 706. Where the Invitee has received his or her invitation in e-mail form, this may be done by clicking a hyper-link to an individual response page at the vendor's web site. Where the invitation is delivered in SMS form, the Invitee may respond by contacting a call centre with direct access to such a page. If the Invitee still chooses to do nothing at that point at step 704 the possibility of his or her involvement would cease as soon as it becomes clear that the Purchase Terms cannot be met, or if the cut-off date has been reached at step 705.

On the other hand, if the Invitee chooses at any time to respond by hyper-linking to an Individual Response Page at step 706, he or she may either decline the invitation at step 707 or accept it and provide the requested financial details at step 711. As discussed, the nature of such details will vary according to the type of electronic payment system used. For example, it may be in the form of credit card numbers and expiry dates, or information transmitted via a smart card or in an electronic purse. If the Invitee declines the invitation at step 707, the server system may provide him or her with the opportunity to suggest substitute or additional Invitees at step 708. This opportunity will only be provided where the Coordinator has previously enabled this option (411, 412, 413). The Invitee's involvement would then cease at that point at step 709.

If the Invitee chooses to proceed by joining in at step 711, he or she may also be provided with the opportunity to name additional Invitees in circumstances where the Coordinator had chosen to make this option available (411, 412, 413) at step 712. The server system then evaluates whether the Purchase Terms have been met (a process described in detail in section 5 below) at step 713. The Participant may then be referred to a status page for a summary of the progress of the PEP Proposal (see section 4(d) below) at step 714. If the Purchase Terms are not met by the cut-off date—in spite of that Invitee having agreed to participate—confirmation is sent at step 710, and that Invitee's involvement ceases at that point at step 709. If the Purchase Terms are met, confirmation is sent and a value transfer takes place at step 715.

b) Individual Response Pages

As discussed above, the Invitees may respond to their invitations by hyper-linking to individual response pages. If an Invitee agrees to participate in a joint purchase, he or she is entering into a contract not only with the vendor, but also with the other Participants. Accordingly, it is important for each Invitee to understand the Purchase Terms thoroughly so far as they relate to him or her. It is therefore desirable that each response page be tailored to address the Invitees individually, and describe the Purchase Terms as simply and directly as possible.

It would be possible for the individual response pages to correspond to the contribution methods illustrated in FIG. 4. An alternative method is illustrated in FIGS. 8A, 8B and 8C, which provide examples of possible Individual Response Pages used for different Purchase Term combinations in one embodiment of the invention.

FIG. 8A gives an example of an Individual Response Page where the respective contributions of each Invitee are known at the end of the PEP Proposal Establishment Phase. This will occur where the contributions are to be made in equal shares and where the numbers of Participants is set at a particular number (rather than as a range) at step 406. It will also occur where the Participants will be contributing amounts specified by the Coordinator as at step 404. As illustrated in FIG. 8A, these combinations can be described in the same manner.

FIG. 8B gives an example of an Individual Response Page where the Participants are to contribute in equal shares, but where the final number of Participants is not known by the end of the process. This would occur where the Coordinator specifies a minimum, maximum, or minimum and maximum number of Participants rather than a set number at step 406. In this case, it is possible to calculate a range of amounts to be paid by each of the Participants, but the final amount cannot be known until the total number of Participants has been determined.

FIG. 8C gives an example of an Individual Response Page where the Invitees choose the amount of their contribution at step 405.

FIGS. 8A, 8B and 8C provide examples of how Individual Response Pages can be tailored to explain the Purchase Terms in a simple and direct manner in each of the main variations of the present embodiment of the invention. They contain a number of common elements:
(i) A note of welcome and a brief invitation to contribute towards a joint purchase item or items for a specific person along with an explanation of the reason for the purchase (i.e. details of occasion): 801, 810, 819;
(ii) Details about the various Invitees, and the current status of their invitations (along with, where appropriate, the amounts of the requested or actual contributions): 802-805, 811-813, 820-824. FIGS. 8A, 8B and 8C show three alternative indicators of the current status of the invitations: "agreed", "declined" and "awaiting response". Those familiar with the art would know that it would be possible for the server system to display other indicators, including: "received but not yet opened", or "received and opened";
(iii) A statement explaining the consequences of participation to the Invitee: 806, 815, 825. This sets out the steps that will be followed if the Invitee agrees to participate where both the Purchase Terms have been satisfied and where they have not been satisfied;
(iv) An option for the Invitee to agree to or decline the invitation: 807 and 808, 816 and 817, 826 and 827;
(v) An opportunity for the Invitee to obtain a more comprehensive explanation of the system and method: 809, 818, 828.

Those familiar with the art will know that some of the above elements can be omitted or rearranged or adapted in various ways. It would also be possible to include additional information if required. For example, the page might include a summary tablet showing the number of Invitees, the number who have agreed to or declined their invitations, and statistics such as the average contributions made by each Participant. The information might be conveyed using text or graphics or a combination of text or graphics.

The layout shown in FIG. 8A is the simplest of the three example Individual Response pages. It displays an invitation for the Invitee to contribute a specific, nominated amount ($Z.00) 801 and also shows the specific amounts requested from the other Invitees ($X.00 and $Y.00) 804.

In contrast the Individual Response Page represented by FIG. 8B does not show the specific amounts requested from any of the Invitees. As discussed above, this cannot be known until the final number of Participants has been determined. Therefore, FIG. 8B shows the range of amounts that the Invitee might be liable to pay, which is calculated on the basis that a minimum or maximum number of Invitees agree to participate 814. FIG. 8B also contains an optional statement that might be used to give dynamic information regarding the range of contributions, which is up-dated as the number of committed Participants changes 814.

FIG. 8C covers the situation where the Invitees choose the amounts of their contributions (possibly within specified ranges) 820. Under this scenario, the process culminates as soon as the required amount has been raised between each of the Participants. Important pieces of information that might be shown under this scenario are the target amount, the amount raised to date and the remaining outstanding balance 821.

c) The choice to accept

Invitees can signify their intention to participate in the PEP Proposal by clicking on the relevant section of the Individual Response Page (807, 816, 826). In one embodiment of the invention, performing this action would take the Invitee to a payment acceptance page (FIG. 9), where he or she would then be asked to enter the details required for the transfer of funds with the relevant electronic payment system. For example, Participants using credit or charge cards may be asked to enter their names (901, 902 and 903) and select the type of credit or charge card from a list provided in a drop-down menu (904 and 905). They may then be asked to enter the relevant card number (906 and 907) and card expiry date (908, 909 and 910).

The payment acceptance page also contains a section that indicates the amount or range of amounts of the contribution to be made by the Participant (911, 912 and 913). In order to avoid confusion and unworkable proposals, the payment acceptance page must be configured so that it only accepts payments for amounts that are consistent with the Purchase Terms. Accordingly, the precise operation of this section would vary depending upon the nature of the Purchase Terms established by the Coordinator. For example, there are certain circumstances where the exact amount of each contribution would be known as soon as the Coordinator sets the Purchase Terms. These are discussed in relation to FIG. 8A above. Here, the payment acceptance page would display the, precise amount of the required contribution as an un-editable field (so that it cannot be changed or altered by the Invitee) 912. Where the Invitee would be agreeing to a range of amounts (as discussed in relation to FIG. 8B above) both the minimum amount and the maximum amount of the contributions would be displayed (912 and 913). This information could be dynamic in the sense that it displays the range of contributions calculated not simply by reference to the Purchase Terms, but also by reference to the actual number of Invitees who have indicated they will participate (for example, the required minimum number of Invitees might be three, but four may have already agreed to participate, which would decrease the maximum amount payable by each Participant). Where the Invitees choose the amount of their own contribution (as discussed in relation to FIG. 8C above), the payment acceptance page must ensure that certain nominated amounts are rejected. For example, some amounts may be below or above a range nominated by the Coordinator. Further, Invitees should not be able to nominate amounts that exceed the outstanding balance. Preferably, the entries made by the Invitees should be verified on the client systems using a client-side scripting language, as well as by the Vendor's server system. Client-side scripting expedites the process of identifying any logical errors because the relevant entries can be checked without the need to upload to the server system. A short explanation reminding the Invitee of such restrictions may also appear on this web page 914.

The Invitee is then given an option to continue or to go back 915 and 916. Going back will take the Invitee to the Individual Response Page and give him or her the opportunity to decline the invitation. If he or she clicks "continue" after entering the required information, the Participant will be taken to a status page (described at section (d) below). The Invitee may optionally be taken to one of the general e-commerce pages 105 on the vendor's web site 102.

d) Status Pages

After the Invitees have entered their credit card details, the server system may send each of them a web page which displays the current status of their particular PEP Proposal (Status Page). Each Participant can return to the Status Page at regular intervals to check on the progress of their particular PEP Proposal (possibly after entering a password). It is desirable for the Status Pages to present information to the Participants in a manner that is tailored as far as possible to the relevant Purchase Term combinations selected by the Coordinator.

Some of the information that may be included on the Status Page includes:
- a description of the nominated purchase item(s);
- a brief summary of the Purchase Terms;
- the identity of the other Invitees;
- the status of the various invitations made under the relevant PEP Proposal;
- the number of Invitees who have agreed to participate;
- the current maximum and minimum contribution amounts (where the Participants are to contribute in equal shares); and
- the amount raised to date, and the amount to be raised before any target is reached.

The Status Pages merely utilise conventional aspects of e-commerce and they are not described in detail here.

5. Watchdog algorithms

The timely and accurate assessment of the progress of each PEP Proposal is crucial to the effective operation of the present invention. Each Participant has an interest in identifying when the PEP Proposal has failed or cannot be satisfied at the earliest possible time. This gives each Participant as much time as possible to arrange an alternative joint purchase. The vendor also has an interest in identifying unsuccessful PEP Proposals at the earliest possible opportunity because this will assist its inventory management. Further, purchasers generally have an interest in their individual contribution amounts being smaller rather than larger. Where the purchase is to be made in equal shares, and the Coordinator has specified that a minimum and maximum number of Participants is acceptable, the individual contributions will decrease as the number of Participants increases. In such circumstances, it is desirable for a PEP Proposal to be kept open if there is a chance that more Participants will join in to lower the individual contribution amounts. This is referred to as "optimisation" of the PEP Proposal.

In the preferred embodiment of the present invention, the server system assesses each PEP Proposal in light of these considerations using various watchdog algorithms. The assessment is made automatically, without the involvement of the vendor or Participants. The server system assesses each PEP Proposal at periodical intervals marked by "evaluation milestones". The two evaluation milestones that trigger the operation of the various watchdog algorithms described below are the receipt of responses from new Invitees, and the change of date. This algorithm can be implemented in any number of languages (including Visual Basic, C, C++, Pascal and Java), and is executed by an operating system specific scheduling service (such as Server Agent on Windows 95, Windows 98, Task Scheduler on Windows 2000 or cron on Unix etc). The various ways to implement the following algorithms using these various software systems will be obvious to one skilled in the art.

(a) Purchase in equal shares

Figure 10A:
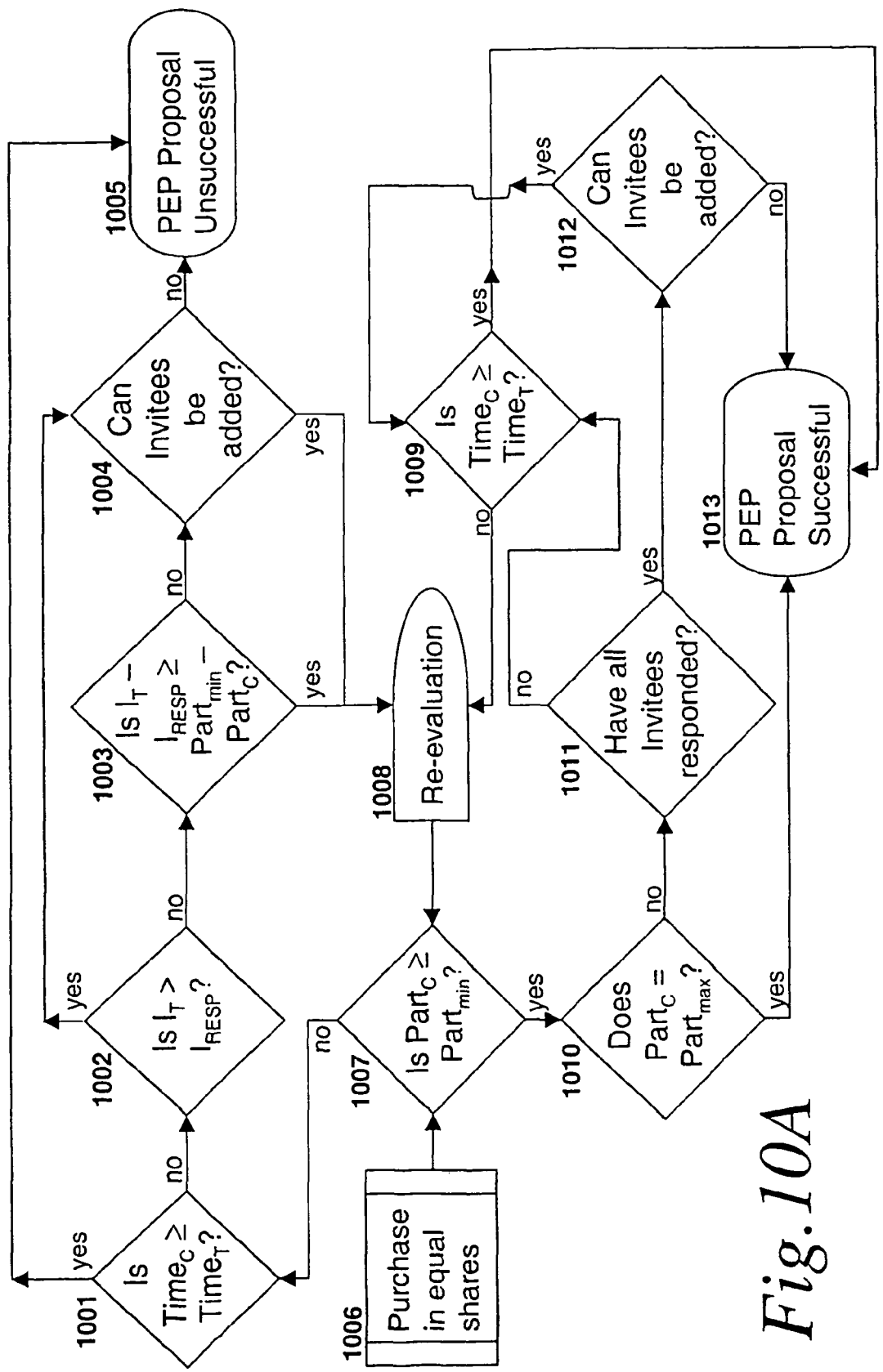
FIGS. 10A, 10B and 10C are flow diagrams illustrating the watchdog algorithms designed to determine whether a PEP Proposal is successful, unsuccessful or can no longer be successful.

FIG. 10A illustrates the process by which the server system can evaluate a PEP Proposal where the Participants contribute in equal shares 1006. It shows that such a PEP Proposal will be judged to be successful where the current number of Participants ($Part_c$) is greater than or equal to the required minimum number of Participants ($Part_{min}$) (i.e. 1007=yes), and:
- the maximum number of Participants ($Part_{max}$) has also been reached (i.e. $Part_c = Part_{max}$) (1010=yes); or
- while the maximum number of Participants has not been reached (i.e. $Part_c \neq Part_{max}$) (1010=no), all the Invitees have responded (1011=yes) and additional people cannot be invited (1012=no); or
- while the maximum number of Participants has not been reached (i.e. $Part_c \neq Part_{max}$) (1010=no), all the Invitees have responded (1011=yes) and additional people can be invited (1012=yes), but the current date ($Time_c$) equals the cut-off date ($Time_T$) (in other words, the cut-off date has been reached) ($Time_c \geq Time_T$) (1009=yes); or
- the maximum number of Participants has not be reached (i.e. $Part_c \neq Part_{max}$) (1010=no), and while all of the Invitees have not responded (1011=no) the cut-off date has been reached ($Time_c \geq Time_T$) (1009=yes).

FIG. 10A also illustrates that a PEP Proposal will be judged to be unsuccessful where the minimum number of Participants has not been reached ($Part_c \neq 0$ $Part_{min}$) (1007=no), and:
- the cut-off date has been reached ($Time_c \geq Time_T$) (1001=yes); or
- the cut-off date has not been reached ($Time_c < Time_T$) (1001=no), all Invitees have responded ($I_T = I_{RESP}$) (1002=yes), and additional people cannot be invited (1004=no); or
- the cut-off date has not been reached ($Time_c < Time_T$) (1001=no), the total number of Invitees ($I_T$) is greater than the number of Invitees who have responded ($I_{RESP}$) (i.e. not all Invitees have responded) ($I_T > I_{RESP}$) (1002=no), the number of Invitees yet to respond ($I_T - I_{RESP}$) is less than the number of Participants that must still agree to join in for the PEP Proposal to be successful ($Part_{MIN} - Part_c$) (1003=no) and additional people cannot be invited (1004=no).

FIG. 10A illustrates that a PEP Proposal needs to be re-evaluated where:
- the minimum number of Participants has been reached ($Part_c \geq Part_{min}$) (1007=yes), and while the maximum number of Participants has not been reached ($Part_c \neq Part_{min}$) (1010=no), and all the Invitees have responded (1011=yes), additional people can be invited (1012=yes), and the cut-off date has not been reached ($Time_c < Time_T$) (1009=no); or
- the minimum number of Participants has been reached ($Part_c \geq Part_{min}$) (1007=yes), the maximum number of Participants has not be reached ($Part_c < Part_{min}$)

($1010$=no) and while all of the Invitees have not responded ($1011$=no), the cut-off date has not been reached (Time$_C$<Time$_T$) ($1009$=no); or the minimum number of Participants has not been reached (Part$_c$<Part$_{min}$) ($1007$=no), the cut-off date has not been reached (Time$_C$<Time$_T$) ($1001$=no), not all Invitees have responded (I$_T$>I$_{RESP}$) ($1002$=no), and the number of Invitees yet to respond is greater than or equal to the number of Participants that must still agree to join in for the PEP Proposal to be successful (I$_T$-I$_{RESP}$>Part$_{MIN}$-Part$_C$) ($1003$=yes); or the minimum number of Participants has not been reached (Part$_c$<Part$_{min}$) ($1007$=no), the cut-off date has not been reached (Time$_C$<Time$_T$) ($1001$=no), not all Invitees have responded (I$_T$>I$_{RESP}$) ($1002$=no), the number of Invitees yet to respond is less than the number of Participants that must still agree to join in for the PEP Proposal to be successful (I$_T$-I$_{RESP}$<Part$_{min}$-Part$_C$) ($1003$=no), but additional people can be invited to join in ($1004$=yes).

In all cases, where the server system judges that a re-evaluation is required, there is a delay until the next evaluation milestone is reached.

(b) Purchase in amounts specified by the Coordinator

Figure 10B:
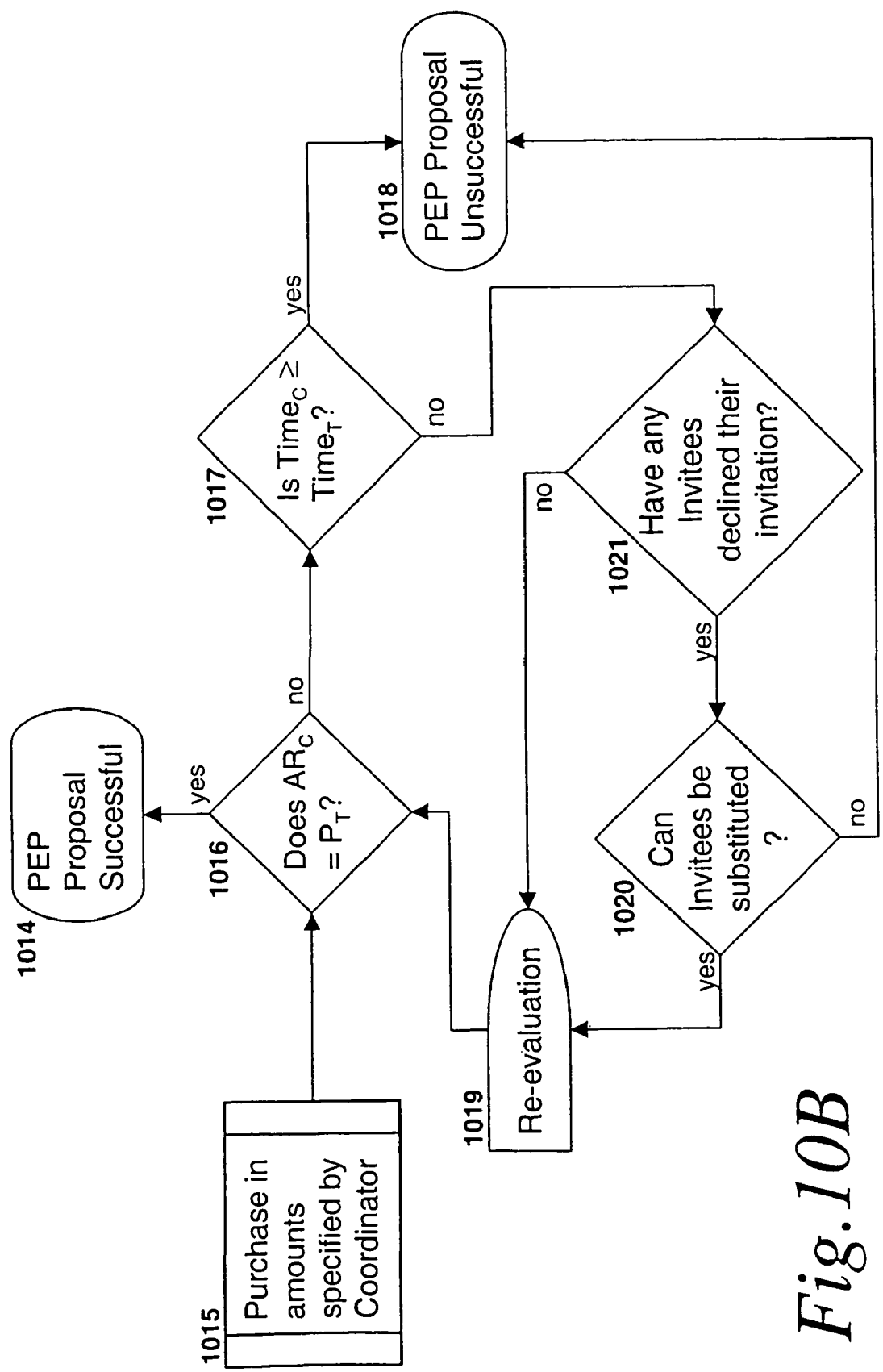

FIG. 10B illustrates the process by which the server system can evaluate a PEP Proposal where the purchase is made in amounts specified by the Coordinator 1015.

It shows that such a PEP Proposal will be judged to be successful where the current amount raised (AR$_c$) equals Total Price (P$_T$) (i.e., the total price has been raised) ($1016$=yes).

It also illustrates that such a PEP Proposal will be unsuccessful where:

the total price has not been raised (AR$_C$≠F P$_T$) ($1016$=no) and the cut-off date has been reached (Time$_C$2 Time$_T$) ($1017$=yes); or the total price has not been raised (AR$_C$≠P$_T$) ($1016$=no) and while the cut-off date has not been reached (Time$_C$<Time$_T$) ($1017$=no), at least one Invitee has declined his or her invitation ($1021$=yes) and Invitees cannot be substituted ($1020$=no).

FIG. 10B illustrates that such PEP Proposals need to be re-evaluated where:

the total price has not been raised (AR$_C$≠P$_T$) ($1016$=no), the cut-off date has not been reached (Time$_C$<Time$_T$) ($1017$=no), and no Invitees have declined their invitations ($1021$=no); or the total price has not been raised (AR$_C$≠P$_T$) ($1\,016$=no), the cut-off date has not been reached (Time$_C$<Time$_T$) ($1017$=no), and while at least one Invitee has declined his or her invitation ($1021$=yes), Invitees can be substituted ($1020$=yes).

(c) Purchase in amounts chosen by the Participants

Figure 10C:
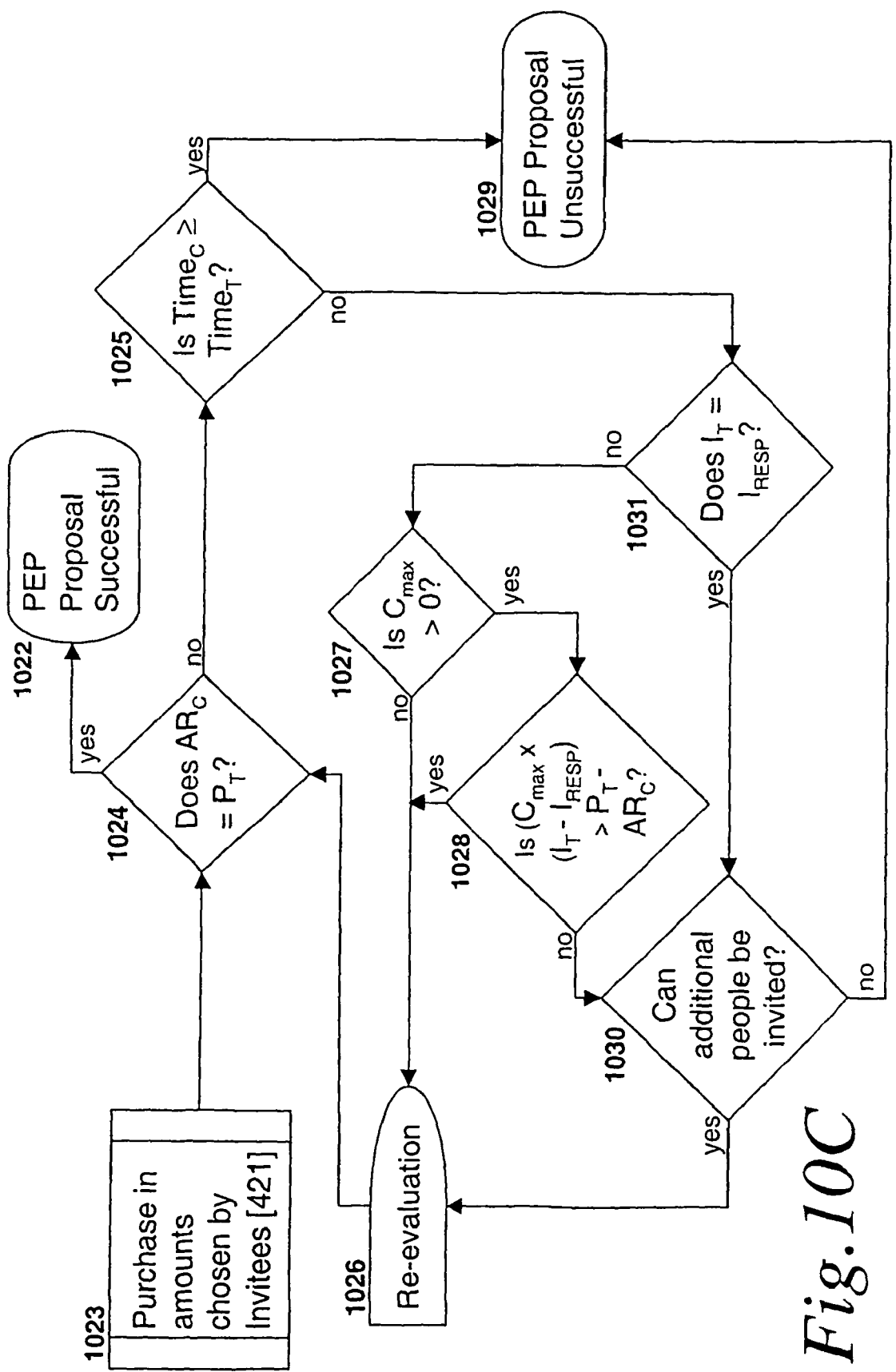

FIG. 10C illustrates the process by which the server system can evaluate a PEP Proposal involving the purchase where Participants contribute amounts of their choice 1023.

Such a PEP Proposal will be judged to be successful where the Total Price has been raised (AR$_C$=P$_T$) ($1024$=yes).

It also illustrates that such a PEP Proposal will be unsuccessful where:

the Total Price has not been raised (AR$_C$≠P$_T$) ($1024$=no) and the cut-off date has been reached (Time$_C$≧Time$_T$) ($1025$=yes); or the Total Price has not been raised (AR$_C$≠P$_T$) ($1024$=no), the cut-off date has not been reached (Time$_C$<Time$_T$) ($1025$=no), the total number of Invitees have responded (I$_T$=I$_{RESP}$) ($1031$=yes) and additional people cannot be invited ($1030$=no); or the Total Price has not been raised (AR$_C$≠P$_T$) ($1024$=no), the cut-off date has not been reached (Time$_C$<Time$_T$) ($1025$=no), the total number of Invitees have not responded (I$_T$>I$_{RESP}$) ($1031$=no), but there is a maximum contribution (C$_{max}$>0) ($1027$=yes) and the maximum contribution multiplied by the number of Invitees who have yet responded (I$_T$-I$_{RESP}$) is less than the total price minus the current amount raised (P$_T$-AR$_C$) ($1028$=no), and additional people cannot be invited ($1030$=no).

FIG. 10C illustrates that such a PEP Proposal must be re-evaluated where:

the Total Price has not been raised (AR$_C$≠P$_T$) ($1024$=no), the cut-off date has not been reached (Time$_C$<Time$_T$) ($1025$=no), the total number of Invitees have responded (I$_T$=I$_{RESP}$) ($1031$=yes) and additional people can be invited ($1030$=yes); or the Total Price has not been raised (AR$_C$≠P$_T$) ($1024$=no), the cut-off date has not been reached (Time$_C$<Time$_T$) ($1025$=no), the total number of Invitees have not responded (I$_T$≠I$_{RESP}$) ($1031$=no) and there is no maximum contribution ($1027$=no); or the Total Price has not been raised (AR$_c$g F P$_T$) ($1024$=no), the cut-off date has not been reached (Time$_C$<Time$_T$) ($1025$=no), the total number of Invitees have not responded (I$_T$≠I$_{RESP}$) ($1031$=no) there is a maximum contribution (C$_{max}$>0) ($1027$=yes), and the maximum contribution multiplied by the number of Invitees who have yet responded (C$_{max}$×(I$_T$-I$_{RESP}$)) is greater than the total price minus the current amount raised (P$_T$-AR$_C$) ($1028$=yes); or the Total Price has not been raised (AR$_C$≠P$_T$) ($1024$=no), the cut-off date has not been reached (Time$_C$<Time$_T$) ($1025$=no), the total number of Invitees have not responded (I$_T$≠I$_{RESP}$) ($1031$=no), there is a maximum contribution (C$_{max}$>0) ($1027$=yes) and the maximum contribution multiplied by the number of Invitees who have yet responded (C$_{max}$≠(I$_T$-I$_{RESP}$)) is less than the total price minus the current amount raised (P$_T$-AR$_C$) ($1028$=no) and additional people can be invited ($1030$=yes).

6. Payment Administration

As discussed, the present invention involves a delay between the time when an Invitee agrees to become a Participant, and the time when the PEP Proposal is successful. Accordingly it is important for the system and method to administer payment processing securely and effectively.

The standard way for coordinating payments in e-commerce transactions is to charge credit cards in real time as soon as the relevant details have been received. This means that value would be transferred from the Participants to the vendor at or about the time that the card details are provided. A number of problems are associated with using this method in conjunction with the present invention. If the Purchase Terms are not met, it would be necessary to credit each Participant's account for the relevant amount (a process known as "charging back"). This may involve delay, and may involve bank charges. Moreover, Participants might be unwilling to have their credit cards charged before the Purchase Terms have been met. Further, under some of the possible Purchase Terms combinations that may be established using the present system and method, the precise amount payable by each Participant is not known until all of the Invitees have responded to their invitations or the cut-off date has been reached. It would not be possible to ensure these credit cards are charged the correct final amount before this time.

The preferred method for addressing these payments is utilises direct debit pre-authorised payments. This would involve the Invitee's Bank 114 and the Coordinator's Bank 111 or Invitee's Bank 114 storing a record of a pre-authorised debit amount by placing a "hold" over a certain portion of the Invitee's credit limit. Often the interaction between these various banks (111, 113 and 114) and parties (101, 104 and 108) is coordinated by a Gateway system 112. Where the Participants consent to a range of payments being charged to their credit cards, the hold could be placed over the maximum amount that might be charged to their card. If the Purchase Terms are met, the vendor would initiate a payment request in its capacity as a direct debit originator. Use of this method has a would mean that the Invitee's credit card is only charged where the Purchase Terms have been met, and that it would not be necessary for the vendor to store commercially sensitive information on its system while waiting for the Invitees' responses. It also avoids the possibility of having the payment refused due to changes in the customer's credit status between the response and the debit request.

An alternative method for handling this problem would be for the Participants to make the payments to a third party who would hold them in escrow, pending the successful completion of the PEP Proposal. This is potentially a more convenient option than a credit card charge back, as organisations that specialise in managing escrow payments can effect the return of funds more quickly than do banks. Nevertheless it may involve additional charges and some delay.

A third, less sophisticated way of approaching the problem would be for the vendor to use standard pre-authorised payments. This involves using "real time" payment authorisation but to delay the request for that authorisation until after the Purchase Terms have been met. In one embodiment of the invention, this method would require the vendor to store the relevant credit card details on its own system in a payment database 110. The financial details of each Participant are entered into this database over a secure network through the PEP-related pages 109 on the vendor's web site 102, however this information should not accessible via the web site in the same way as access to information contained in the PEP Proposal database 107 or Inventory database 103. Further, while stored in the payment database 110, the data should be encrypted so that it would be of no use to unauthorised persons who obtain it. In the event that the Purchase Terms are met, the vendor would ask its Acquiring Bank 113 for authorisation to accept the payment tendered by the customer, and would transmit the credit card data along with this request. Using this alternative, the vendor's system would need to ensure that the expiry date of the credit card or charge card is after the cut-off date. This is because if the credit card expiry date occurs after the cut-off date the Participant's bank would refuse the debit request at the time it is made by the vendor.

In a variation of this embodiment, it would be possible for the vendor to outsource the storage and handling of the data to the Gateway System 112. An identifier would be assigned to the financial data stored by the Gateway System and this identifier would either be the same as that used by the vendor for the relevant PEP Proposal, or cross-referenced to that identifier. When the Purchase Terms for a particular PEP Proposal are satisfied, the Server System would send a message to the Gateway System identifying the PEP Proposal and requesting it to coordinate the relevant payments.

The use of this method of delayed requests for "real time" payment authorisations has a number of advantages over the simple "real time" authorisation method. If the vendor delays before initiating the request for payment until the Purchase Terms are satisfied, this would mean that the precise amount payable by each Participant will be known in all possible combinations of the Purchase Terms. Further, utilising this method would ensure that the Participant's credit cards are not charged in the event that the Purchase Terms are not met.

However there are two main disadvantages associated with this method. The need to store credit card and other details requires the vendor's system or the gateway system to take measures to ensure the security of data over a period of time. These can be very costly, and there is a risk that such measures can be breached. A second disadvantage is the possibility of refusals being made by the banks when the vendor initiates the request for payment. This possibility would exist even if the vendor obtains an initial authorisation to accept the Participant's credit card details at the response date. This might be because the Participant's credit limit could have been exceeded between the date of the response and the date of the request for payment, or the credit card may be lost or stolen. Therefore, pre-authorised direct debits are to be preferred.

7. Order administration

Where the vendor sells a physical product rather than a service, the server system would also administer a database of stock or inventory 106. This database would typically contain a list of the products offered by the vendor for sale and a record of the quantity of each of these products held in stock. Where the items are not in stock the Inventory Database might also contain an estimate of the time it will take to bring the item into stock.

It would be possible for the server system to mark the chosen item as reserved in the inventory database 106 pending the successful completion of the Purchase Terms. This is important to the vendor's inventory management, as the vendor must have at least one of each item in stock ready to be delivered when required. Alternatively, a selected item might not be in stock when first selected by the Coordinator, and it would be necessary to ensure the item is in stock should the Purchase Terms be satisfied. However vendors also have an interest in minimising the level of stock on hand in order to reduce costs. Given the possibility that PEP Proposals may not result in the purchase of nominated items, it may be uneconomical to reserve or order into stock every item nominated for purchase using the present invention.

The vendor can manage inventory levels using estimates based on accumulated experience with the present system and method. Historical data can be compiled by using information obtained from the PEP Proposal Database 109. This data may include information such as the percentage of PEP Proposals that proceed successfully to completion, or more sophisticated data such as the proportion of successful PEP Proposals that result once a certain percentage of the money is raised or a certain percentage of Invitees agree to participate. This data could be subjected to statistical analysis which accounts for seasonal variations at various points in time throughout the year (e.g. Christmas). All such information can be used to manage the levels of stock in the PEP process.

What is claimed is:

1. A retailing method executable by a computer system, said method comprising:

sending a page from said computer system to a prospective purchaser in response to a request, said page being associated with a specific product;

said computer system receiving a purchase proposal from said prospective purchaser for direct joint purchase of said product at a fixed price, the purchase proposal including identifier information of plural other persons nominated by the prospective purchaser and purchase term information selected at least in part by the prospective purchaser, said nominated plural other persons being nominated to contribute to said direct purchase of said product at said fixed price such that the direct joint purchase of said product can only be made by one or more of said nominated persons, and said purchase proposal being formulated in part by the prospective purchaser nominating a contribution scheme selected from a plurality of contribution schemes provided by said computer system, each scheme being a different way to divide the exact purchase price among the participants;

sending terms of the purchase proposal using said computer system to the nominated persons, the terms sent to each nominated person including the identity and/or contribution of each of the other nominated persons and a request for payment;

said computer system receiving, in response to said request for payment, respective payment information from two or more of the nominated persons;

said computer system processing said payment information using the mechanism of direct debit pre-authorized payments to secure a hold in respect of at least one contribution;

said computer system initiating payment requests to enable the direct joint purchase to be completed in accordance with the said purchase term information; and said computer system ensuring that the sum of all received payments equals said fixed price.

2. The method of claim 1, wherein said prospective purchaser is one of said nominated persons.

3. The method of claim 1, further comprising:
receiving identifier information of one or more further persons also nominated to contribute to said direct joint purchase of said product at said fixed price;
wherein the direct joint purchase of said product can only be made by said prospective purchaser and/or one or more nominated persons consisting of the previously nominated persons and the one or more further persons.

4. The method of claim 1, wherein each request for payment sent to said nominated persons specifies a corresponding payment amount so that the sum of the payment amounts equals said fixed price.

5. The method of claim 1, wherein each request for payment specifies a range of amounts for a corresponding range of numbers of contributors to said purchase so that each sum of payment amounts for a corresponding number of contributors equals said fixed price.

6. The method of claim 1, further comprising:
receiving contribution information relating to said selected contribution scheme from said prospective purchaser;
verifying the consistency of said contribution information with said selected contribution scheme; and
provided there is such consistency, transmitting proposal information to said nominated persons according t., the identifier information, said proposal information including a link to said purchase proposal.

7. A retailing method executable by a computer system, said method comprising:
sending a page from said computer system to a prospective purchaser in response to a request, said page being associated with a specific product;
said computer system receiving a purchase proposal from said prospective purchaser for direct joint purchase of said product at a fixed price, with the terms of the purchase proposal;

a) including identifier information of plural other persons nominated by the prospective purchaser;
b) purchase term information selected at least in part by the prospective purchaser, said nominated plural other persons being nominated to contribute to said direct purchase of said product at said fixed price such that the direct joint purchase of said product can only be made by one or more of said nominated persons; and
c) being formulated in part by the prospective purchaser selecting one contribution scheme from a plurality of contribution schemes provided by said computer system, such contribution schemes including at least two of the following:
i) a scheme which assists the prospective purchaser to establish said purchase terms by inviting nominated persons to contribute in equal amounts that together add up exactly to said fixed price;
ii) a scheme which assists the prospective purchaser to establish said purchase terms by inviting nominated persons to contribute in unequal amounts selected by the prospective purchaser that together equal said fixed price; or
iii) a scheme which assists the prospective purchaser to establish said purchase terms by inviting nominated persons to contribute in amounts selected by the nominated persons that together equal said fixed price;

sending terms of the purchase proposal using said computer system to the nominated persons, the terms sent to each nominated person including the identity and/or contribution of each of the other nominated persons and a request for payment;

said computer system receiving, in response to said request for payment, respective payment information from two or more of the nominated persons;

said computer system processing said payment information using the mechanism of direct debit pre-authorized payments to secure a hold in respect of at least one contribution;

said computer system initiating payment requests to enable the direct joint purchase to be completed in accordance with the said purchase term information; and said computer system ensuring that the sum of all received payments equals said fixed price.

8. The method of claim 7, wherein said prospective purchaser is one of said nominated persons.

9. The method of claim 7, further comprising:
receiving identifier information of one or more further persons also nominated to contribute to said direct joint purchase of said product at said fixed price;
wherein the direct joint purchase of said product can only be made by said prospective purchaser and/or one or more nominated persons consisting of the previously nominated persons and the one or more further persons.

10. The method of claim 7, wherein each request for payment sent to said nominated persons specifies a corresponding payment amount so that the sum of the payment amounts equals said fixed price.

11. The method of claim 10, wherein each request for payment specifies a range of amounts for a corresponding range of numbers of contributors to said purchase so that each sum of payment amount is for a corresponding number of contributors equals said fixed price.

12. A retailing method executable by a computer system, said method comprising:
sending a page from said computer system to a prospective purchaser in response to a request, said page being associated with a specific product;

said computer system receiving a purchase proposal from said prospective purchaser for direct joint purchase of said product at a fixed price, with the terms of the purchase proposal:
a) including identifier information of plural other persons nominated by the prospective purchaser;
b) purchase term information selected at least in part by the prospective purchaser, said nominated plural other persons being nominated to contribute to said direct purchase of said product at said fixed price such that the direct joint purchase of said product can only be made by one or more of said nominated persons; and
c) being formulated in part by the prospective purchaser nominates the purchase terms by selecting one contribution scheme from a plurality of contribution schemes provided by said computer system, such contribution schemes including at least two of the following:
i) a scheme which assists the prospective purchaser to establish said purchase terms by inviting nominated persons to contribute in equal amounts that together add up exactly to said fixed price;
ii) a scheme which assists the prospective purchaser to establish said purchase terms by inviting nominated persons to contribute in unequal amounts selected by the prospective purchaser that together equal said fixed price; or
iii) a scheme which assists the prospective purchaser to establish said purchase terms by inviting nominated persons to contribute in amounts selected by the nominated persons that together equal said fixed price;
receiving contribution information relating to said selected contribution scheme from said prospective purchaser;
said computer system verifying the consistency of said contribution information with said selected contribution scheme, and provided there is such consistency, transmitting proposal information to said nominated persons according to the identifier information, said proposal information including a link to said purchase proposal;
sending terms of the purchase proposal using said computer system to the nominated persons, the terms sent to each nominated person including the identity and/or contribution of each of the other nominated persons and a request for payment;
said computer system receiving, in response to said request for payment, respective payment information from two or more of the nominated persons;
said computer system processing said payment information using the mechanism of direct debit pre-authorized payments to secure a hold in respect of at least one contribution;
said computer system initiating payment requests to enable the direct joint purchase to be completed in accordance with the said purchase term information; and
said computer system ensuring that the sum of all received payments equals said fixed price.

* * * * *